US009757289B1

(12) United States Patent
Simons et al.

(10) Patent No.: US 9,757,289 B1
(45) **Date of Patent: *Sep. 12, 2017**

(54) MOBILE CHAIR APPARATUS COMPRISING FOOT PEDALS

(71) Applicant: Kenneth A. Simons, Bedminster, NJ (US)

(72) Inventors: Kenneth A. Simons, Bedminster, NJ (US); Ashley Guy, Payson, UT (US)

(73) Assignee: Kenneth A. Simons, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,844

(22) Filed: Jan. 26, 2017

Related U.S. Application Data

(63) Continuation-in-part of application No. 15/048,549, filed on Feb. 19, 2016.

(51) Int. Cl.

| | |
|---|---|
| ***B62M 1/00*** | (2010.01) |
| ***A61G 5/02*** | (2006.01) |
| ***A61G 5/10*** | (2006.01) |
| ***A61G 5/04*** | (2013.01) |
| ***A61G 5/08*** | (2006.01) |

(52) U.S. Cl.
CPC ............ *A61G 5/026* (2013.01); *A61G 5/023* (2013.01); *A61G 5/04* (2013.01); *A61G 5/08* (2013.01); *A61G 5/1051* (2016.11)

(58) Field of Classification Search
CPC ................................ A61G 5/026; B62K 3/005
See application file for complete search history.

(56) References Cited

U.S. PATENT DOCUMENTS 2,576,413 A * 11/1951 Padjen .................. A61G 5/023 280/250
2,643,898 A * 6/1953 Everest .................. A61G 5/023 280/240

(Continued)

FOREIGN PATENT DOCUMENTS

CN 201832055 U 5/2011
CN 202136498 U 2/2012

(Continued)

OTHER PUBLICATIONS

"The EZ Chair—pedal power", Tapping Technology, found on website http://msa.maryland.gov/megafile/msa/speccol/sc5300/sc5339//000113/000000/000450/unrestricted/20040941e/art_1.html, pp. 1-3, downloaded 2015.

(Continued)

*Primary Examiner* — Joseph Rocca
*Assistant Examiner* — Conan Duda
(74) *Attorney, Agent, or Firm* — Norris McLaughlin & Marcus PA

(57) ABSTRACT

A mobile chair apparatus is described that comprises a drive assembly that preferably includes one or more moveable foot pedals, and drive wheels which rotate in response to rotation of the foot pedals by the mobile chair occupant, and a steering assembly which comprises two steering wheels and two armrests, wherein movement of just one armrest will translate into movement of both steering wheels, and wherein the drive assembly and the steering assembly concurrently enable the mobile chair occupant to propel and steer the mobile chair apparatus without assistance from another person.

21 Claims, 25 Drawing Sheets

(56) References Cited

U.S. PATENT DOCUMENTS

| | | | | | |
|---|---|---|---|---|---|
| 2,814,505 | A * | 11/1957 | Kelly | A61G 5/023 | 188/77 R |
| 3,381,973 | A * | 5/1968 | Carr | A61G 5/006 | 280/250.1 |
| 3,387,681 | A * | 6/1968 | Rabjohn | A61G 5/042 | 180/13 |
| 3,666,292 | A * | 5/1972 | Bartos | A61G 5/006 | 280/234 |
| 3,794,132 | A * | 2/1974 | Moon | A61G 5/042 | 180/13 |
| 4,239,248 | A * | 12/1980 | Ewers | A61G 5/02 | 280/270 |
| 4,274,651 | A * | 6/1981 | Dumont | A61G 5/023 | 192/93 R |
| 4,460,190 | A * | 7/1984 | Spiess | A61G 5/023 | 280/247 |
| 4,652,026 | A * | 3/1987 | Byrge | A61G 5/022 | 280/246 |
| 4,826,190 | A * | 5/1989 | Hartmann | B62K 3/005 | 280/236 |
| 4,892,323 | A * | 1/1990 | Oxford | A61G 5/023 | 105/129 |
| 4,993,732 | A * | 2/1991 | Wedemeyer | A61G 5/025 | 280/250.1 |
| 5,007,655 | A * | 4/1991 | Hanna | A61G 5/023 | 280/245 |
| 5,020,815 | A * | 6/1991 | Harris | A61G 5/023 | 280/246 |
| 5,145,196 | A * | 9/1992 | Langkamp | A61G 5/023 | 280/278 |
| 5,242,179 | A * | 9/1993 | Beddome | A61G 5/025 | 280/233 |
| 5,273,304 | A | 12/1993 | Berkheimer | | |
| 5,303,945 | A * | 4/1994 | Oxford | A61G 5/023 | 280/244 |
| 5,324,060 | A | 6/1994 | Van Vooren et al. | | |
| 5,482,125 | A * | 1/1996 | Pagett | A61G 5/042 | 180/6.32 |
| 5,826,897 | A * | 10/1998 | Beard | A61G 5/023 | 280/217 |
| 5,865,455 | A * | 2/1999 | Taylor | A61G 5/025 | 188/2 F |
| 6,092,822 | A | 7/2000 | Salmon | | |
| 6,224,078 | B1 * | 5/2001 | Tidcomb | A61G 5/023 | 280/240 |
| 6,234,504 | B1 * | 5/2001 | Taylor | A61G 5/023 | 280/250.1 |
| 6,325,398 | B1 * | 12/2001 | Banzi | A61G 5/023 | 280/244 |
| 6,478,099 | B1 * | 11/2002 | Madwed | A61G 5/045 | 180/21 |
| 7,900,945 | B1 * | 3/2011 | Rackley | A61G 5/023 | 280/244 |
| 8,517,407 | B2 | 8/2013 | Handa et al. | | |
| 8,777,249 | B1 * | 7/2014 | Roman | A61G 5/021 | 280/249 |
| 2002/0101054 | A1 * | 8/2002 | James | A61G 5/023 | 280/250.1 |
| 2004/0026891 | A1 * | 2/2004 | Berkelmans | B62K 5/023 | 280/282 |
| 2004/0051272 | A1 * | 3/2004 | Wong | A61G 5/023 | 280/244 |
| 2005/0093270 | A1 * | 5/2005 | Wilcox | B62K 3/005 | 280/282 |
| 2006/0037788 | A1 * | 2/2006 | Madwed | A61G 5/042 | 180/6.48 |
| 2007/0040349 | A1 * | 2/2007 | Zhao | A61G 5/045 | 280/250.1 |
| 2007/0085297 | A1 * | 4/2007 | Cruft | B62K 3/005 | 280/252 |
| 2008/0129008 | A1 * | 6/2008 | Tarasov | B62M 1/12 | 280/243 |
| 2008/0246246 | A1 | 10/2008 | Dix et al. | | |
| 2009/0283982 | A1 * | 11/2009 | Thomas | A61G 5/023 | 280/234 |
| 2010/0065346 | A1 * | 3/2010 | Porcheron | A61G 5/046 | 180/6.24 |
| 2011/0215547 | A1 * | 9/2011 | Davenport | A61G 5/023 | 280/250.1 |
| 2011/0248467 | A1 * | 10/2011 | Ball | B62K 3/005 | 280/259 |
| 2012/0267175 | A1 * | 10/2012 | Handa | A61G 5/023 | 180/6.2 |
| 2012/0318595 | A1 * | 12/2012 | Belenkov | B62B 15/003 | 180/205.1 |
| 2014/0346752 | A1 * | 11/2014 | Rasmussen | B62K 5/05 | 280/238 |
| 2015/0060156 | A1 * | 3/2015 | Husted | A61G 5/045 | 180/6.48 |
| 2015/0141212 | A1 * | 5/2015 | Wu | A61G 5/12 | 482/80 |
| 2016/0058636 | A1 * | 3/2016 | Chang | A61G 5/023 | 280/230 |

FOREIGN PATENT DOCUMENTS

| | | | |
|---|---|---|---|
| GB | 2308342 | A | 6/1997 |
| JP | 2014104191 | A | 6/2014 |
| TW | 496465 | U | 3/2015 |

OTHER PUBLICATIONS

C. S. Barr, et al, "Pedal Powered Wheelchair Seems So Wrong", found on website http://www.ohgizmo.com/2008/04/09/pedal-powered-wheelchair-seems-so-wrong/, 2008, pp. 1-3.

"About the Chair", found on website http://www.pedalwheelchair.com/about-the-chair.html, pp. 1-2, downloaded 2015.

Canadian Office Action in corresponding application CA 2956619 dated Jun. 7, 2017.

Partial European Search Report (including provisional opinion accompanying the same) issued in corresponding application 17154423.2 dated Jun. 12, 2017.

* cited by examiner

MOBILE CHAIR APPARATUS COMPRISING FOOT PEDALS

This application is a continuation-in-part of U.S. application Ser. No. 15/048,549, filed Feb. 19, 2016, the disclosure of which patent application is incorporated herein by reference.

FIELD OF THE INVENTION

This application relates to a mobile chair apparatus, which enables an occupant user of the apparatus to steer and propel movement of the chair without assistance from another person.

DISCUSSION AND COMPARISON WITH RELEVANT PRIOR ART

Currently there is an unmet need for providing mobility to people who have limited ambulation, in particular people who retain limited use of their legs but have difficulty standing for an extended period of time and/or walking long distances. Limited ambulation afflicts many patients suffering from neurological diseases such as Multiple Sclerosis, Parkinson's disease, Spinal Stenosis, etc. as well as patients with temporary or permanent injuries and strokes. While these patients have limited use of one or both legs, many activities of daily living, including but not limited to shopping, attending a sports game, and travel, can be challenging.

The mobile chair apparatus described herein (also referred to as the "Pedal Chair") seeks to address this unmet need by providing improved mobility and independence to persons who have reduced movement in one or both legs and some movement in at least one arm. The Pedal Chair is also useful as an exercise device for patients in need thereof. Briefly, according to an embodiment of the instant invention, the pedal chair apparatus is a mobile chair apparatus having a front end, a rear end, a top side and a bottom side, which comprises: (a) a steering assembly comprising: i. a first armrest connected to a first link arm, and a second armrest connected to a second link arm; ii. a first tie rod connected to the first link arm and a second tie rod connected to the second link arm; iii. a first steering block connected to the first tie rod and a second steering block connected to the second tie rod; iv. a third tie rod interconnecting the first and the second steering blocks; and v. a first steering wheel and a second steering wheel each located at the rear end of the mobile chair apparatus, the first and second steering wheels move in response to movement of one or both of the first and second armrests, and (b) a drive assembly preferably comprising a pair of foot pedals, and (c) a seat.

A number of mobility chairs with pedaling mechanisms have been proposed. Unlike the Pedal Chair, many prior art devices are removable attachments to conventional wheelchairs, including those discussed in U.S. Pat. No. 5,273,304, U.S. Pat. No. 5,324,060 and U.S. Patent Application Publication No. 2008/0246246. Attaching such prior art devices to a conventional wheelchair can prove difficult for someone with limited use of one or more of their limbs. Moreover, since the conventional wheelchair is not designed to be moved using propulsion provided by rotation of foot pedals, the apparatus assembled using said attachments could be cumbersome and inefficient in translating movement of the foot pedals to forward movement of the chair. Further, the assembled apparatus lacks many of the desirable features of the novel Pedal Chair described herein. For instance, the assembled apparatus in each of these references has front steering wheels and larger rear driving wheels of the conventional wheelchair, as well as additional wheel or wheels provided by the attachment. In contrast, the Pedal Chair of the instant invention requires only 4 wheels, i.e., two front drive wheels and two rear steering wheels, to be operable. In a preferred embodiment, the novel Pedal Chair can comprise a seatback that is foldable into the apparatus via a hinge or pivot connection. In contrast, the seat position in a conventional wheelchair is fixed. Additional embodiments of the Pedal Chair includes a length-wise and angle-wise adjustable boom and optional electrical assist, which are not available in the prior art designs.

U.S. Pat. No. 6,092,822 teaches a stand-alone wheelchair comprising foot pedals that may be self-propelled by a person in the chair or pushed by another person. As with the teaching of the '304 patent, the '060 patent, and the '246 Publication, the wheel placement of the '822 patent reflects the conventional design, i.e., two front steering wheels and two larger rear driving wheels. Importantly, the steering mechanism of the '822 patent differs from that of the Pedal Chair in that steering of the '822 patent is accomplished by moving a handle in the form of a longitudinal rod. The steering wheel rotates in response to rotation of the longitudinal rod.

A chair known as the "Profhand pedal wheelchair" developed by Yasunobu Handa is described in U.S. Pat. No. 8,517,407 and is commercially available from Pedal Wheelchair LLC of Barberton, Ohio. The wheels of the Profhand pedal wheelchair, unlike conventional wheelchair designs, include two front drive wheels and a single rear steering wheel. Unlike the Pedal Chair, the "Profhand pedal wheelchair" requires outriggers with two additional wheels towards the rear end and front end of the chair, apparently for stability. In a preferred embodiment, the support shaft (boom) of the Pedal Chair on which the foot pedals are located is adjustable both in angle and in length, unlike that of the "Profhand pedal wheelchair. Moreover, the steering mechanism of the "Profhand pedal wheelchair" differs from that of the Pedal Chair in that it requires use of working fingers to grasp and operate the steering arm either located on the right or left side of the chair. The steering mechanism further attaches to the steering rear wheel via a cable connection that requires adjustment, which system is prone to breakage.

Japanese Publication No. JP 2014104191 teaches a foot pedal-driven wheelchair having a rotating shaft on which the pedals are mounted. According to this design an idler wheel is provided on the right and left sides of the seat; a single steering wheel for determining travel direction is provided separately from the idler wheel at the rear of the chair, and driving force of the rotating shaft driven by motion of the foot pedals is transmitted to the steering wheel to drive the steering wheel, and to thereby travel. Further according to this design, direction of travel is controlled by a lever (element 23) having a grip to be held. Thus, operation of this wheelchair requires working fingers.

Chinese Publication No. CN202136498 and Chinese Publication No. CN201832055 describe rehabilitation exercise devices comprising a wheelchair. According to these designs, movement of the foot pedals cause movement of an occupant user's legs, rather than the other way around. To use the rehabilitation exercise device of CN202136498, a patient sits on the wheelchair with the two feet placed on the pedals, and pushes the two main wheels by hand to move forward. The drive wheel drives the driven wheel which is arranged on a support to rotate through a chain, and the driven wheel drives the movable foot pedals to rotate and thus to exercise the lower limbs, so as to achieve the rehabilitation purpose. The chair of CN201832055 requires a non-occupant user to push to move the chair. When the chair is pushed to move, the gear on the rear of the wheelchair drives a chain wheel to rotate by the chain, and the chain wheel drives the pedals to move circumferentially so that the patient can perform recovery motions of legs by sitting on the wheelchair with feet placed on the pedals.

The apparatus of the present invention addresses and overcomes shortcomings of the prior art in one or more respects. In one such respect, none of the foregoing prior art employs armrest-facilitated steering design as provided by the Pedal Chair. The armrest-facilitated steering design provided by the present invention is advantageous over prior art designs because its mechanical connections are robust, and does not require fragile and adjustable components such as a cable which may undesirably be prone to breakage, particularly when used under stress such as when trying to move when the chair is not in motion, and require adjustment or replacement. Moreover, the Pedal Chair can be used by an individual who has even only limited movement of only one arm and no working fingers on either hand. Further, because steering the can be accomplished by movement of either armrest, it is not necessary to rearrange mechanical components of this chair to accommodate patients with disability of different arms, or who wish to exercise different arms.

These and further aspects of the invention will be understood with reference to the following specification and drawings.

SUMMARY OF THE INVENTION

Disclosed is a mobile chair apparatus having a front end, a rear end, a top side and a bottom side, which comprises: (a) a steering assembly comprising: i. a first armrest connected to a first link arm, and a second armrest connected to a second link arm; ii. a first tie rod connected to the first link arm and a second tie rod connected to the second link arm; iii. a first steering block connected to the first tie rod and a second steering block connected to the second tie rod; iv. a third tie rod interconnecting the first and the second steering blocks; and v. a first steering wheel and a second steering wheel each located at the rear end of the mobile chair apparatus, the first and second steering wheels move in response to movement of one or both of the first and second armrests, and (b) a drive assembly preferably comprising a pair of foot pedals, and (c) a seat.

Also disclosed is said mobile chair apparatus comprising an alternative steering assembly arrangement, which comprises (i) first armrest operably connected to a first link arm, and a second armrest operably connected to a second link arm; (ii) a first steering tube operably connected to the first link arm and a second steering tube operably connected to the second link arm; (iii) a first gear assembly operably connected to the first steering tube and a second gear assembly operably connected to the second steering tube; (iv) a first steering wheel operably connected to the first gear assembly and a second steering wheel operably connected to the second gear assembly, wherein the first and second steering wheels are located at the rear end of the mobile chair apparatus, and move in response to movement of one or both of the first and second armrests.

Also disclosed is a mobile chair apparatus having a front end, a rear end, a top side and a bottom side, comprising: (a) a steering assembly, (b) a drive assembly comprising: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a gear hub located at the proximal end of the support shaft; v. a first chain connecting the crank to the gear hub; and vi. a second chain shorter in length than the first chain, said second chain connecting the gear hub to the axles or connecting components of the gear hub, and (c) a seat.

Also disclosed is a mobile chair apparatus having a front end, a rear end, a top side and a bottom side, comprising: (a) a steering assembly, (b) a drive assembly comprising: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle, and (c) a seat.

DETAILED DESCRIPTION

Figure 1:
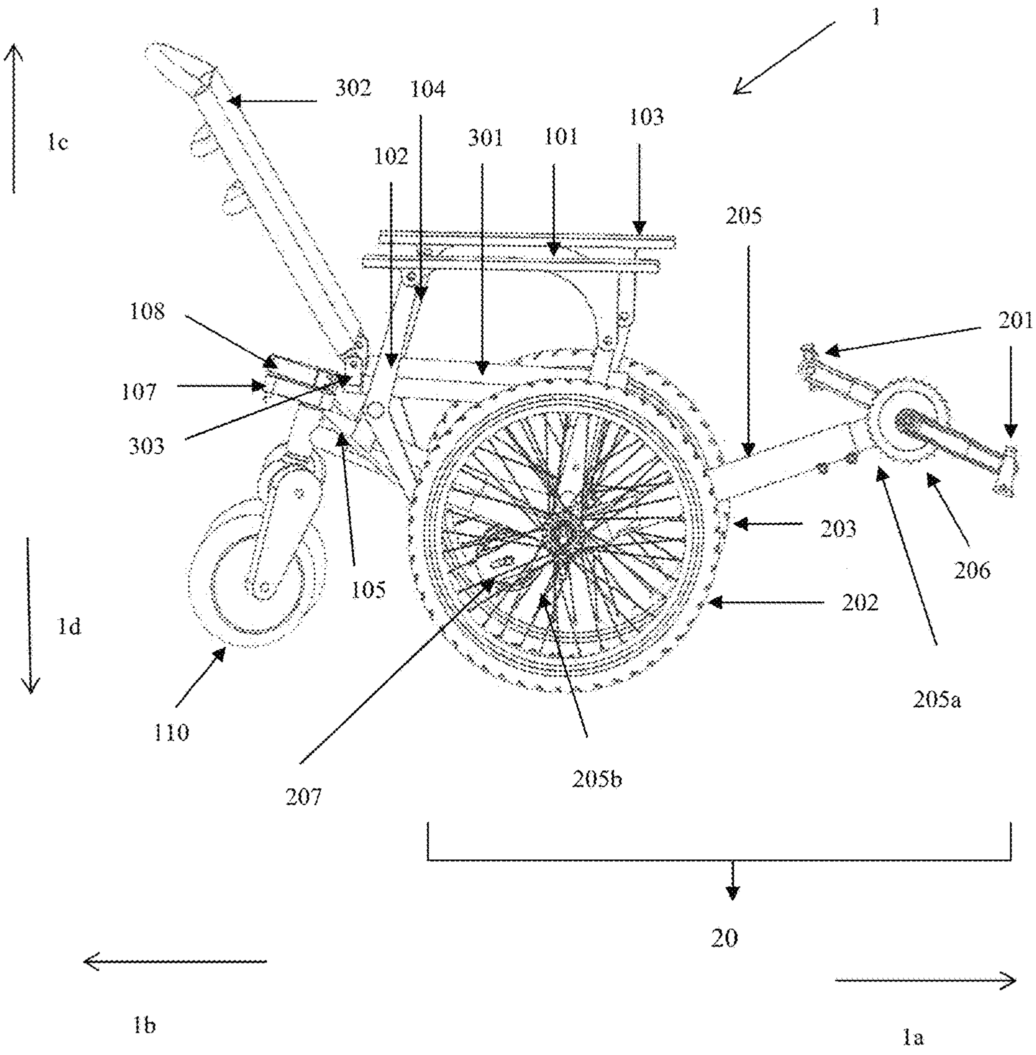
FIG. 1: shows a side perspective view of an embodiment of a mobile chair apparatus (via., Pedal Chair) as described herein.
Figure 2:
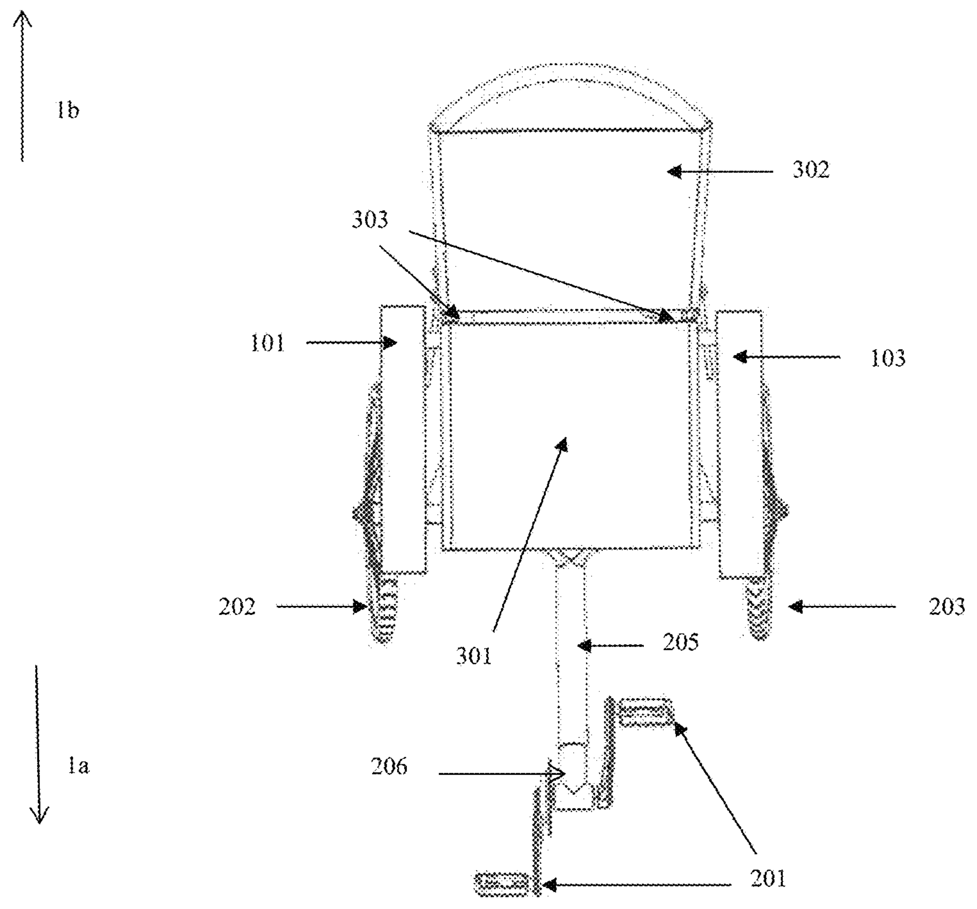
FIG. 2: shows a top view of a mobile chair apparatus as described herein.
Figure 3:
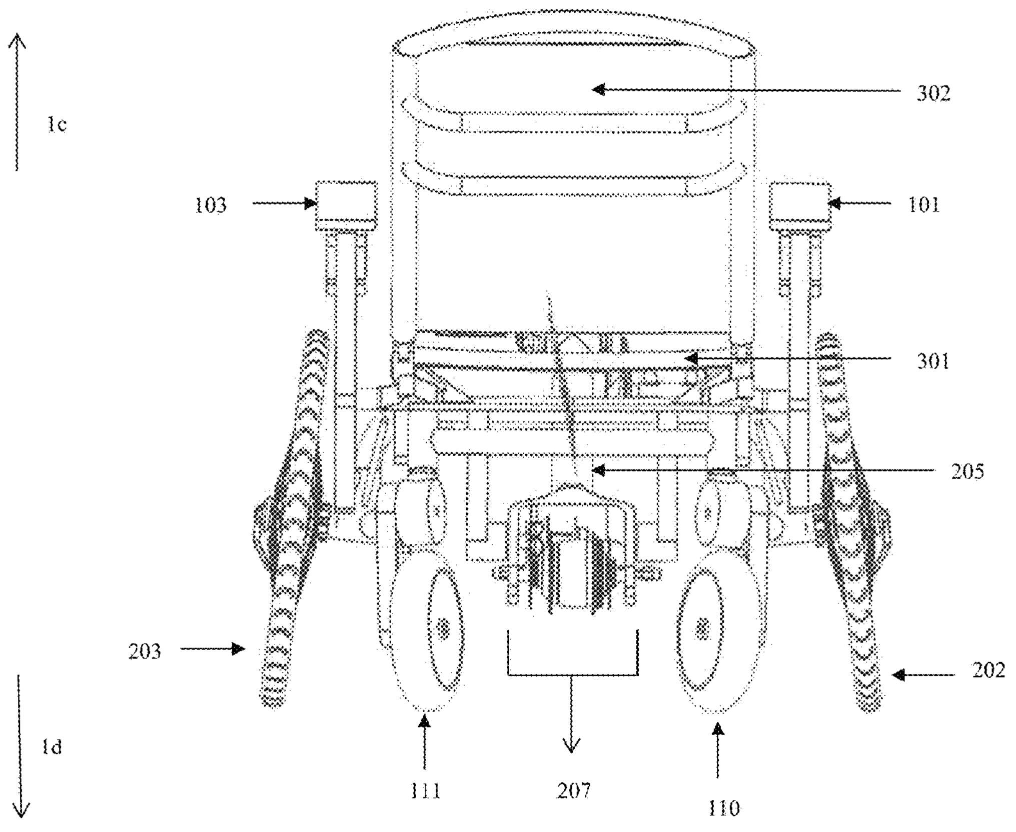
FIG. 3: shows a back view of a mobile chair apparatus as described herein.
Figure 4:
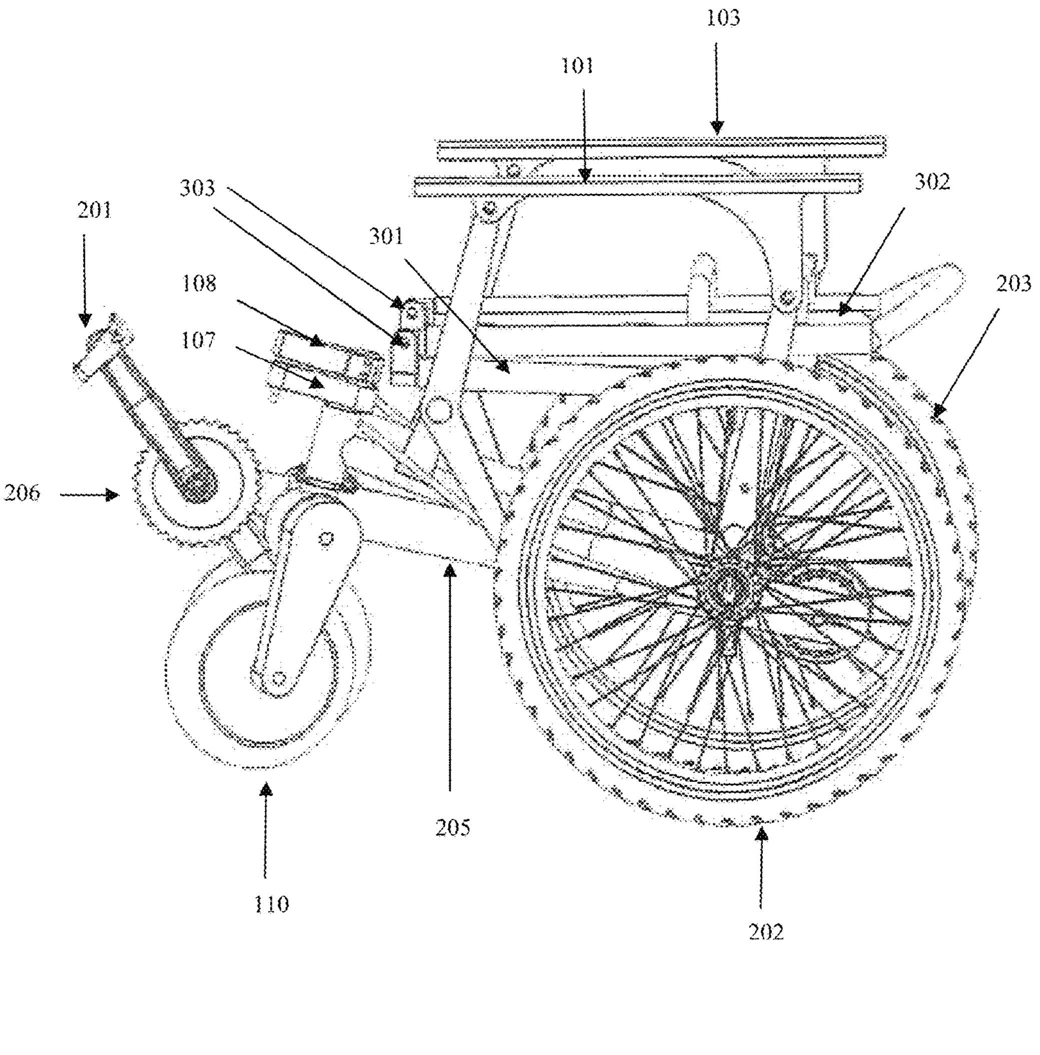
FIG. 4: shows a side perspective view of a mobile chair apparatus as described herein, with seatback and support shaft (pedal support boom) in the folded position.
Figure 5:
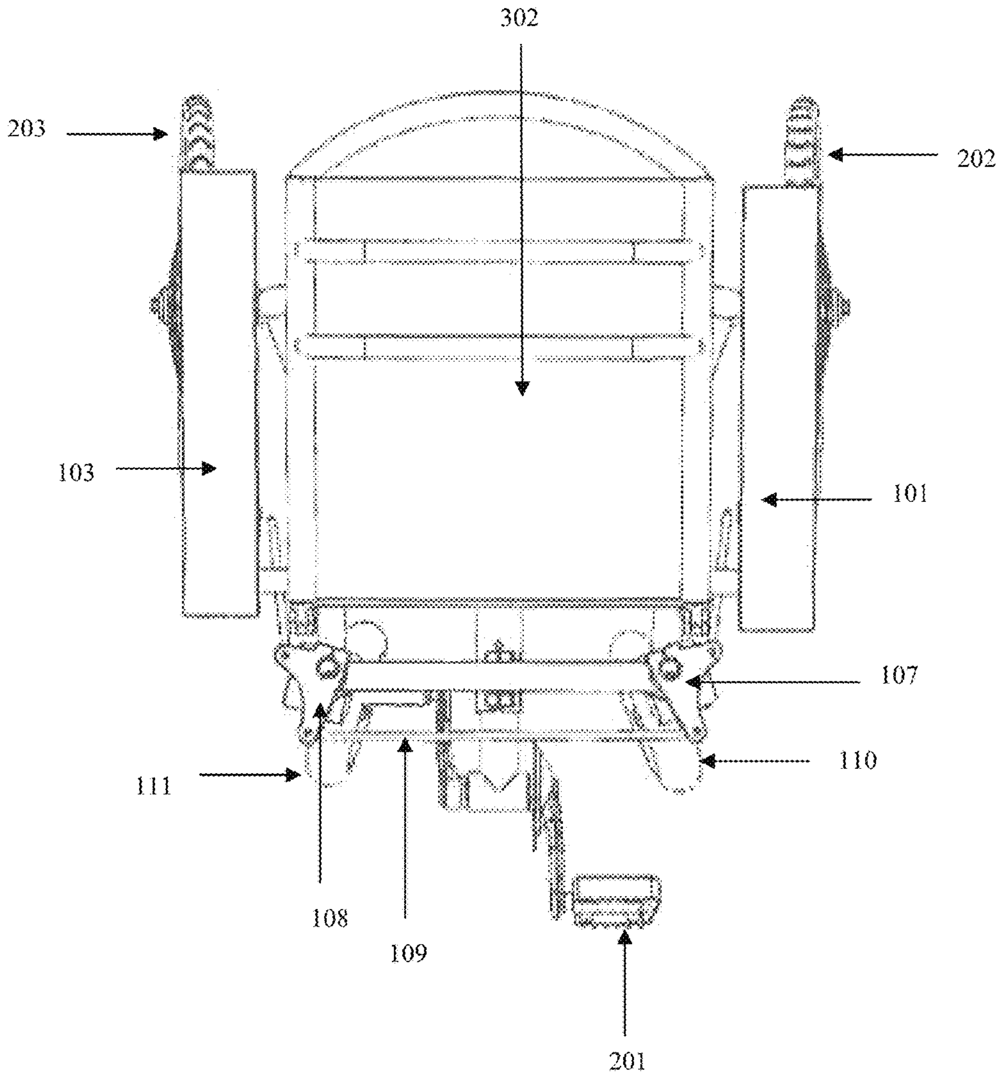
FIG. 5: shows a top view of a mobile chair apparatus as described herein, with seatback and support shaft (pedal support boom) in the folded position.
Figure 6:
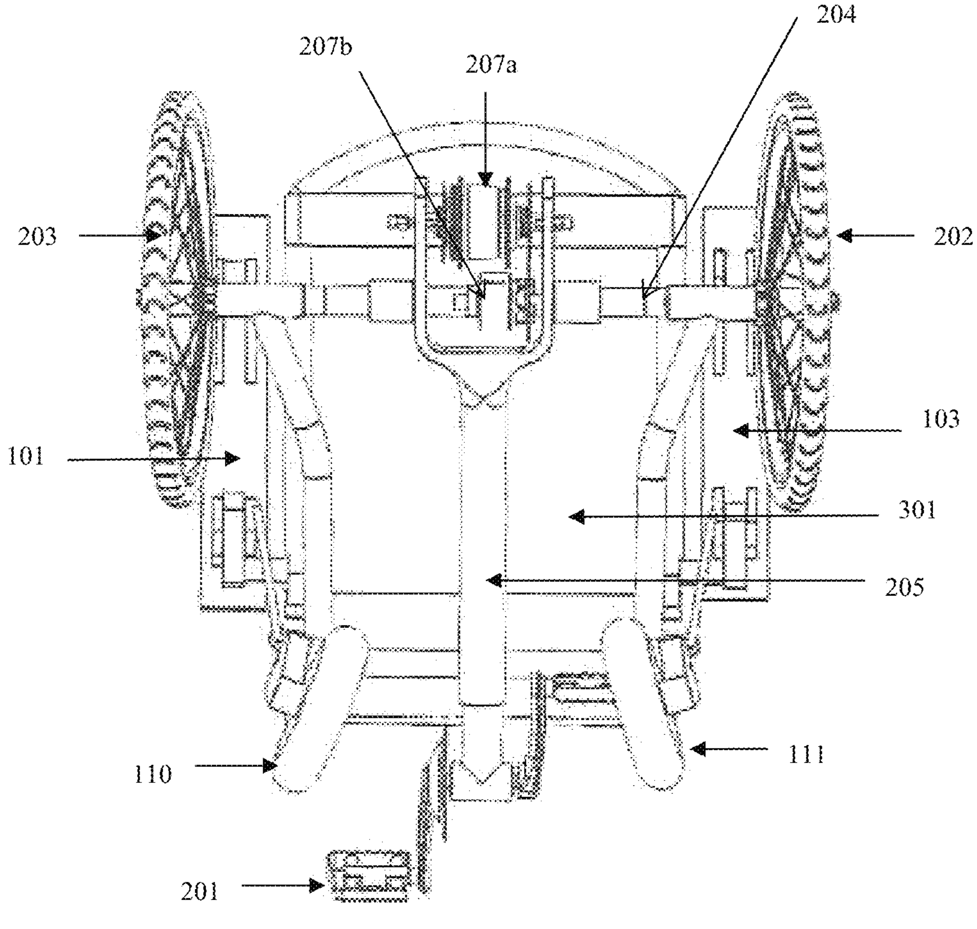
FIG. 6: shows a bottom view of a mobile chair apparatus as described herein, with seatback and support shaft (pedal support boom) in the folded position.
Figure 7:
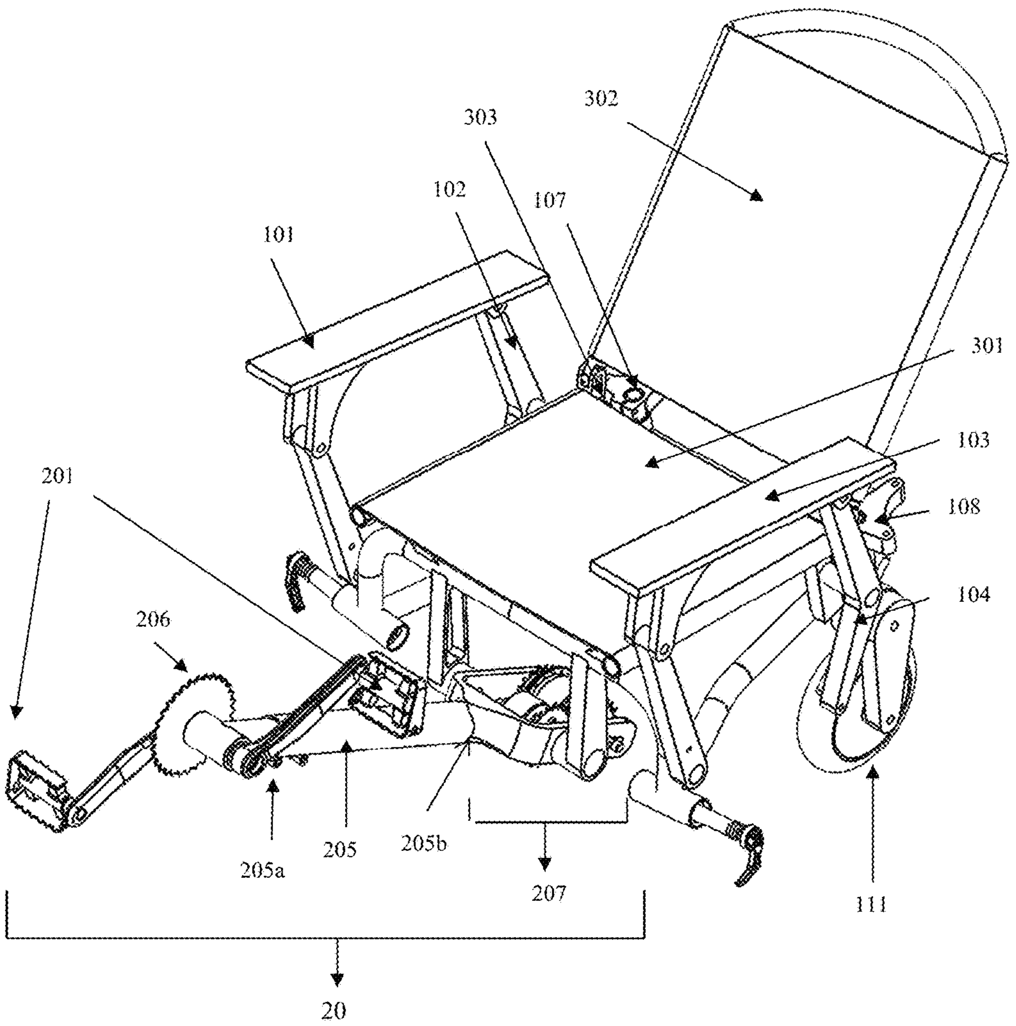
FIG. 7: shows a perspective view of a mobile chair apparatus as described herein, having drive wheels removed.
Figure 8:
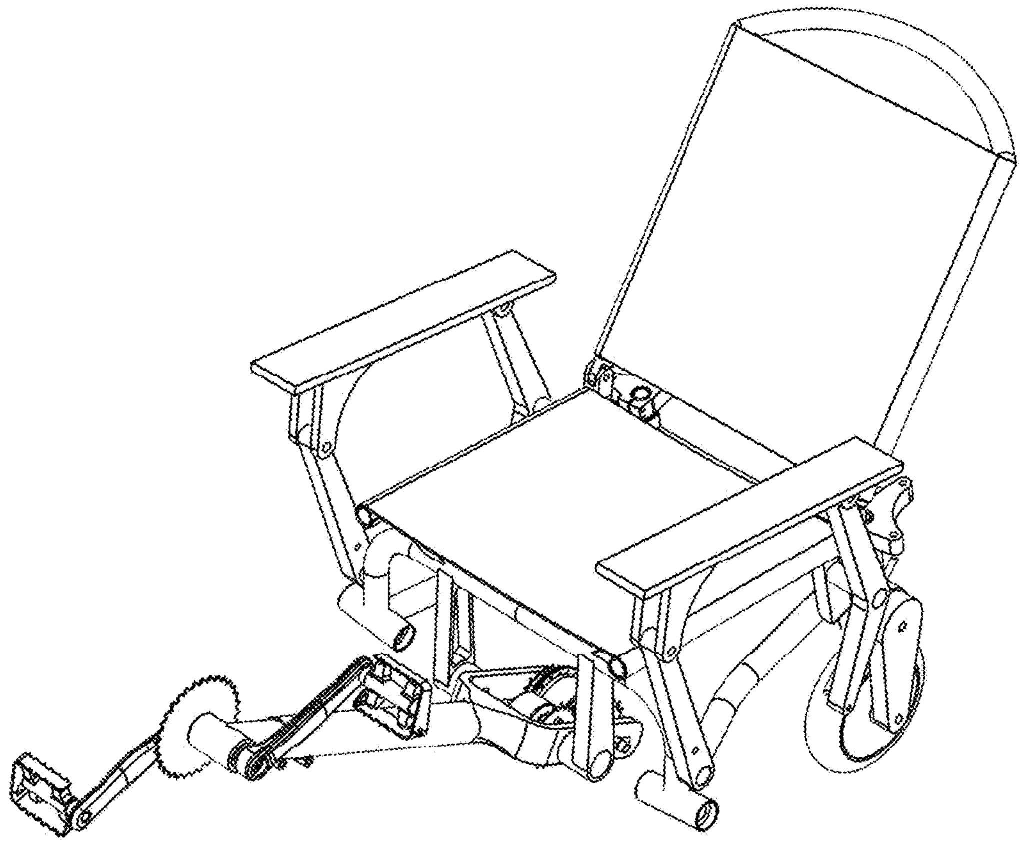
FIG. 8: shows a perspective view of a mobile chair apparatus as described herein, having drive wheels removed.
Figure 9:
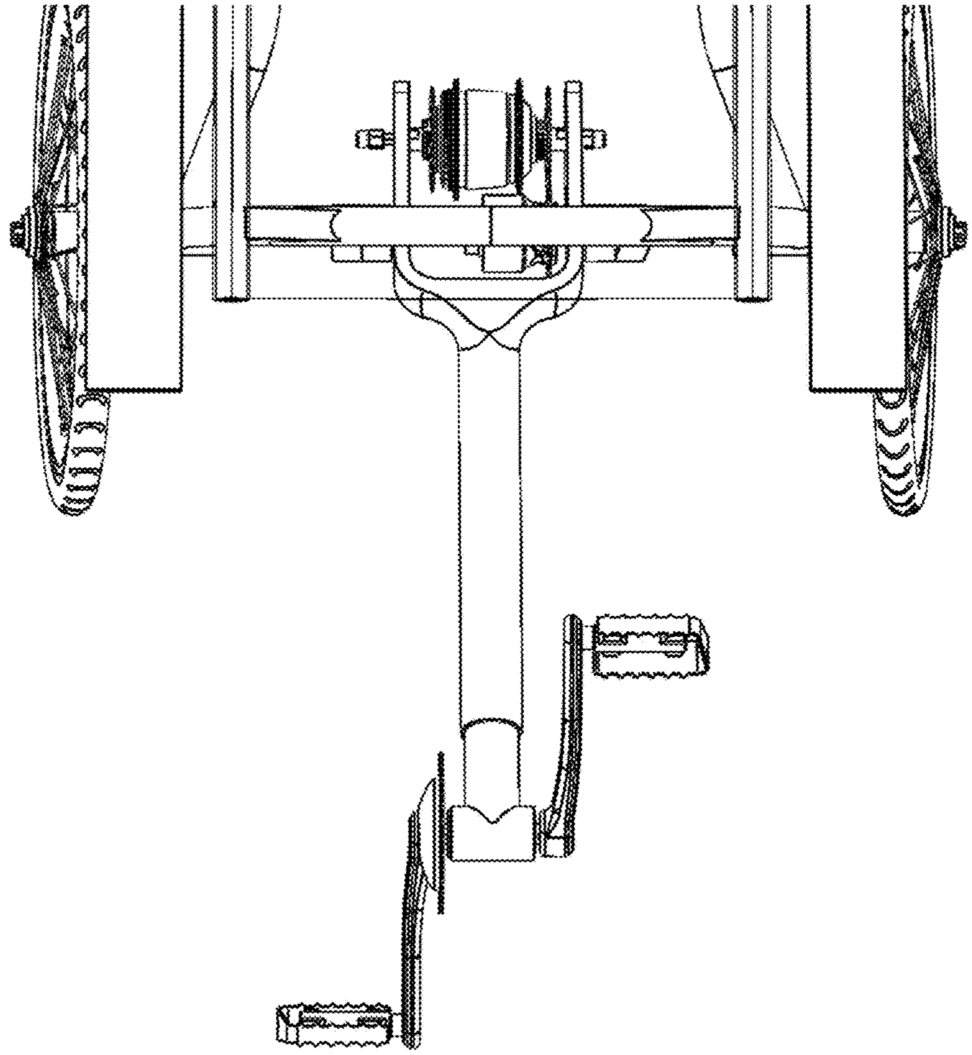
FIG. 9: shows a bottom, close-up view of an example of the drive assembly as described herein.

A mobile chair apparatus is described that comprises a drive assembly that preferably includes one or more moveable foot pedals, and a steering assembly, both of which concurrently enable an occupant user of the mobile chair apparatus to propel and to steer the mobile chair apparatus without assistance from another person. According to an embodiment of the present invention, a chair is mounted on a support frame having 4 wheels attached thereto, two wheels which are used for steering and form part of the steering assembly, and two drive wheels which form part of the drive assembly. The drive wheels rotate in response to rotation of foot pedals by the occupant of the Pedal Chair.

Terms

As used herein, and unless stated otherwise, each of the following terms shall have the definition set forth below.

As used herein, "about" in the context of a numerical value or range means±10% of the numerical value or range recited or claimed. By any range disclosed herein, it is meant that all hundredth, tenth and integer unit amounts within the range are specifically disclosed as part of the invention. Accordingly, "about" a recited value specifically includes that recited value. For example, an angle of about 90° refers to all angles within the range of ±10% of 90° including the angle of 90°.

As used herein, the term "outrigger" refers to any structural component for providing stability, other than the drive and steering wheels, which extends from the mobile chair apparatus and touches the ground when the mobile chair apparatus is positioned upright on a flat surface.

As used herein, support "shaft" refers to an elongated support structure. "Shaft" is being used herein as a term interchangeable with "beam" or "boom" commonly used in the art of mechanical engineering.

In the following drawings figures, like or corresponding elements presented in different drawing figures are identified using the same reference numeral.

With reference to FIGS. 1-19, an embodiment of the disclosed mobile chair apparatus (1) ("Pedal Chair") has a front end (1*a*), a rear end (1*b*), a top side (1*c*) and a bottom side (1*d*) and comprises:

- a) a steering assembly (10) comprising:
  - i. a first armrest (101) connected to a first link arm (102), and a second armrest (103) connected to a second link arm (104), wherein the first and second armrests are preferably disposed on opposite sides of the mobile chair apparatus;
  - ii. a first tie rod (105) connected to the first link arm (102) and a second tie rod (106) connected to the second link arm (104);
  - iii. a first steering block (107) connected to the first tie rod (105) and a second steering block (108) connected to the second tie rod (106);
  - iv. a third tie rod (109) interconnecting the first and the second steering blocks (107, 108); and
  - v. a first steering wheel (110) and a second steering wheel (111) each located at the rear end (1*b*) of the mobile chair apparatus (1), the first and second steering wheels (110, 111) move in response to movement of one or both of the first and second armrests (101, 103), and
- b) a drive assembly (20) preferably comprising a pair of foot pedals (201), and
- c) a seat (301) which may be mounted on a chair frame, and optionally a seatback (302) attached to the seat (301) or the chair frame via a first pivot or hinge connection (303).

A separate embodiment of the Pedal Chair comprises,

- a) a steering assembly (10), and
- b) a drive assembly (20) comprising:
  - i. a first drive wheel (202) and a second drive wheel (203) each connected to an axle (204), which axle can be common are separate;
  - ii. a support shaft (205) having a distal end (205*a*) and a proximal end (205*b*), wherein the proximal end (205*b*) of the support shaft is preferably located on the bottom side (1*d*) of the mobile chair apparatus (1);
  - iii. a pair of foot pedals (201) preferably connected to a pedal crank (206), which are preferably located at the distal end (205*a*) of the support shaft (205);
  - iv. a gear hub (207) preferably located at the proximal end (205*b*) of the support shaft (205);
  - v. a first chain (not shown in the figures for purposes of retaining clarity in the drawing figures, but to be understood as operatively) connecting the foot pedals (201) or the pedal crank (206) to the gear hub (207) whereby the chain transmits motive power from the foot pedals (201) or the pedal crank (206) to the gear hub (207); and
  - vi. a second chain (also not shown in the figures for purposes of retaining clarity in the drawing figures) shorter in length than the first chain, said second chain (to be understood as operatively) connecting the gear hub (207) to the axle or axles (204), whereby the chain transmit motive power from the gear hub (207) to the axle or axles (204) or connecting components of the gear hub (e.g., 207*a* and 207*b*), c) a seat (301) which may be mounted on a chair frame, and optionally a seatback (302) attached to the seat (301) or the chair frame via a first pivot or hinge connection (303).

With further reference to FIGS. 20-24, a further embodiment of the disclosed mobile chair apparatus (1) has a front end (1*a*), a rear end (1*b*), a top side (1*c*) and a bottom side (1*d*) and comprises:

a) a steering assembly (10) comprising:

i. a first armrest (101) operably connected to a first link arm (102), and a second armrest (103) operably connected to a second link arm (104), wherein the first and second armrests are preferably disposed on opposite sides of the mobile chair apparatus;

ii. a first steering tube (114) operably connected to the first link arm (102) and a second steering tube (115) operably connected to the second link arm (104);

iii. a first gear assembly (116) operably connected to the first steering tube (114) and a second gear assembly (117) operably connected to the second steering tube (115);

iv. a first steering wheel (110) operably connected to the first gear assembly (116) and a second steering wheel (111) operably connected to the second gear assembly (117), wherein the first and second steering wheels (110, 111) are located at the rear end (1*b*) of the mobile chair apparatus (1), and move in response to movement of one or both of the first and second armrests (101, 103), and b) a drive assembly (20) preferably comprising a pair of foot pedals (201), and c) a seat (301) which may be mounted on a chair frame, and optionally a seatback (302) attached to the seat (301) or the chair frame via a first pivot or hinge connection (303).

Figure 25:
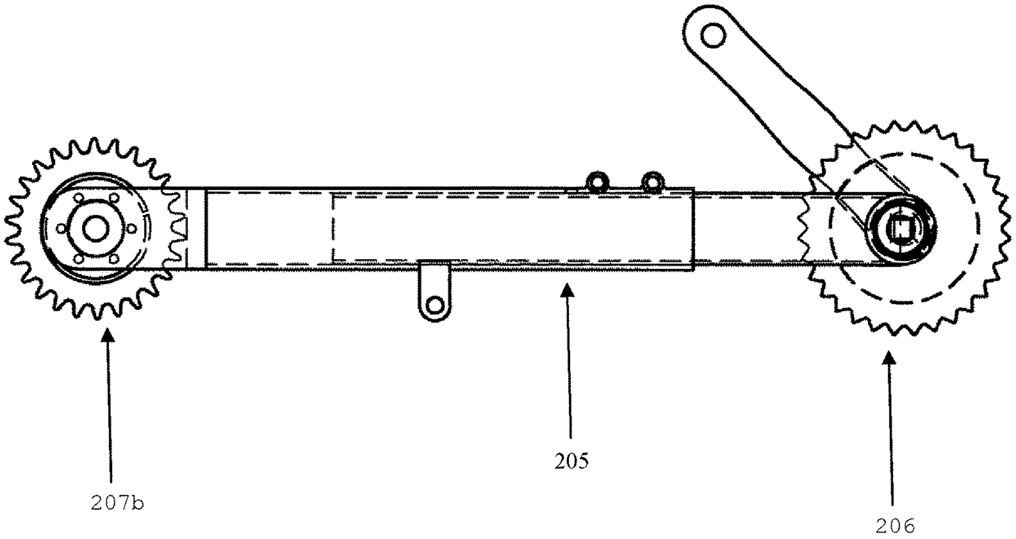
FIG. 25: shows a side view of an alternative arrangement for the drive assembly (20) described herein which design allows for the transfer of motion from the foot pedals to the drive wheels via a single chain operably connecting the crank and the axle. According to this design, a second chain and transmission (207*a*) are not required to transfer motion from the foot pedals to the drive wheels.

With further reference to FIG. 25, according to a further embodiment of the present invention, an alternative arrangement for the drive assembly (20) is provided which comprises: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle.

The specific steering and drive assemblies (10, 20) described above can operate independently of each other on a mobile chair apparatus. However, in a preferred embodiment of the present invention, a Pedal Chair is provided comprising both a steering assembly (10) and a drive assembly (20) as specifically described above. In this embodiment, the first steering wheel (110) and a second steering wheel (111) are each located rearwardly from the first drive wheel (202) and a second drive wheel (203) and each of the first drive wheel (202) and a second drive wheel (203) preferably also being disposed on opposite sides of the mobile chair apparatus (1), in which the orientation of said the first drive wheel (202) and a second drive wheel (203) is controlled by the relative position of at least one of the first and/or second armrests (101, 103).

The Steering Assembly (10)

The primary function of the steering assembly (10) is to convert movement of the first and/or second armrest (101, 103) to a pivoting motion of the first and the second steering wheels (110, 111).

Figure 18:
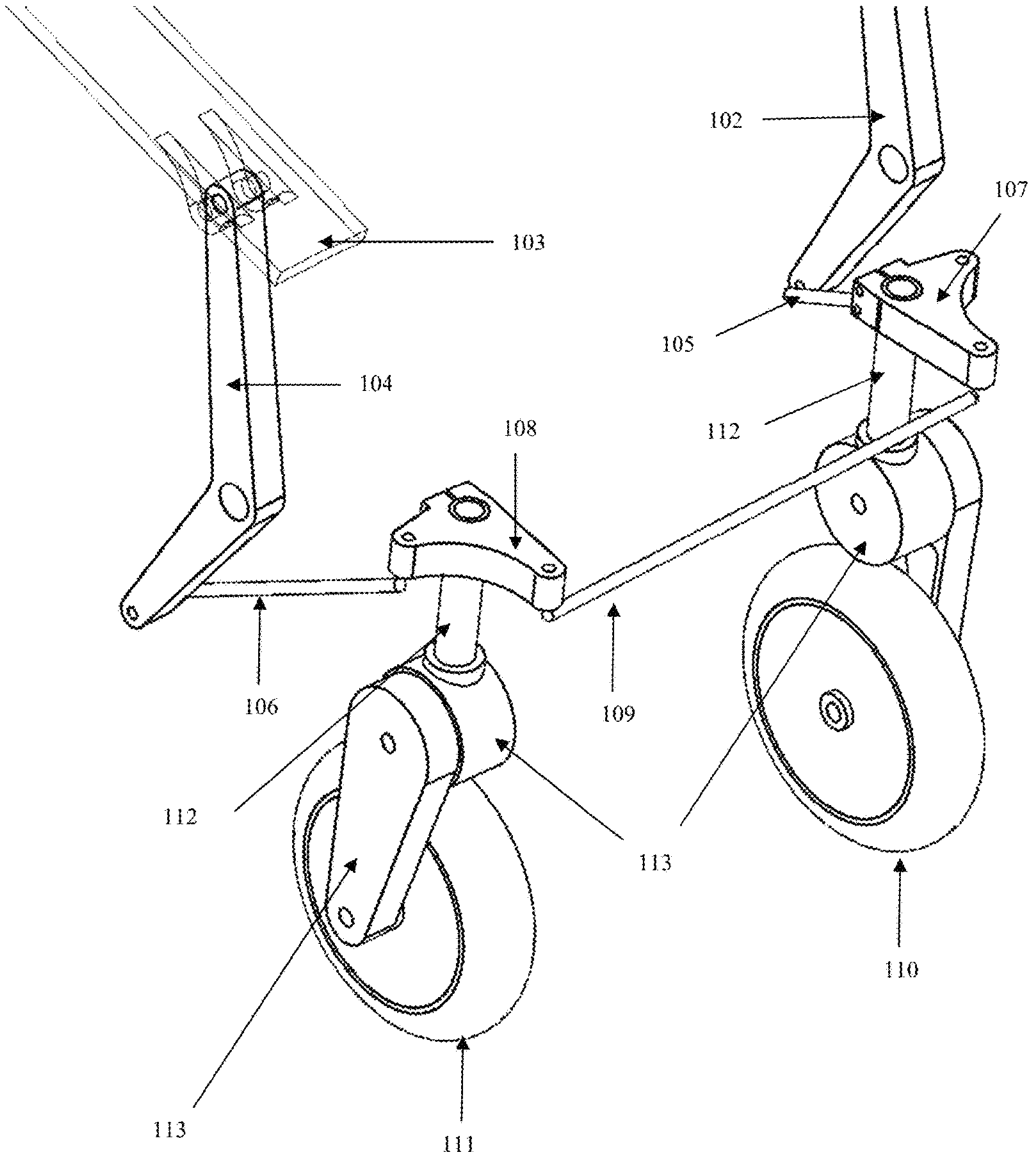
FIG. 18: shows a perspective, close-up view of an example of the steering assembly as described herein.
Figure 19:
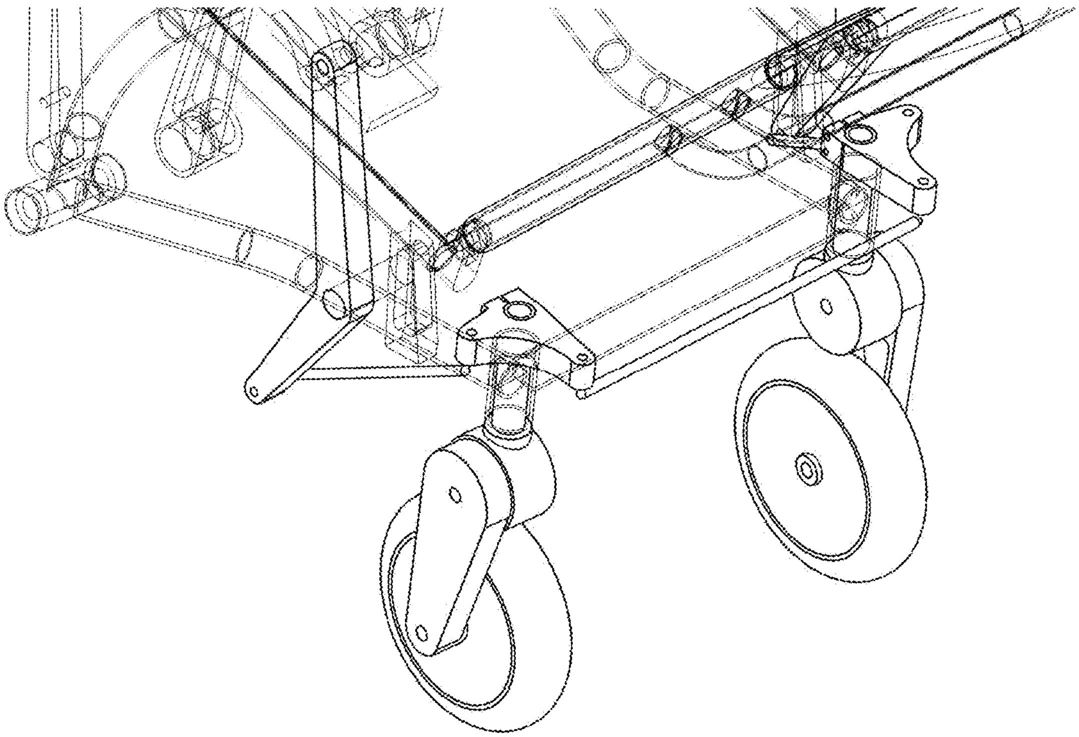
FIG. 19: shows a perspective, close-up view of an example of the steering assembly as described herein.
Figure 20A:
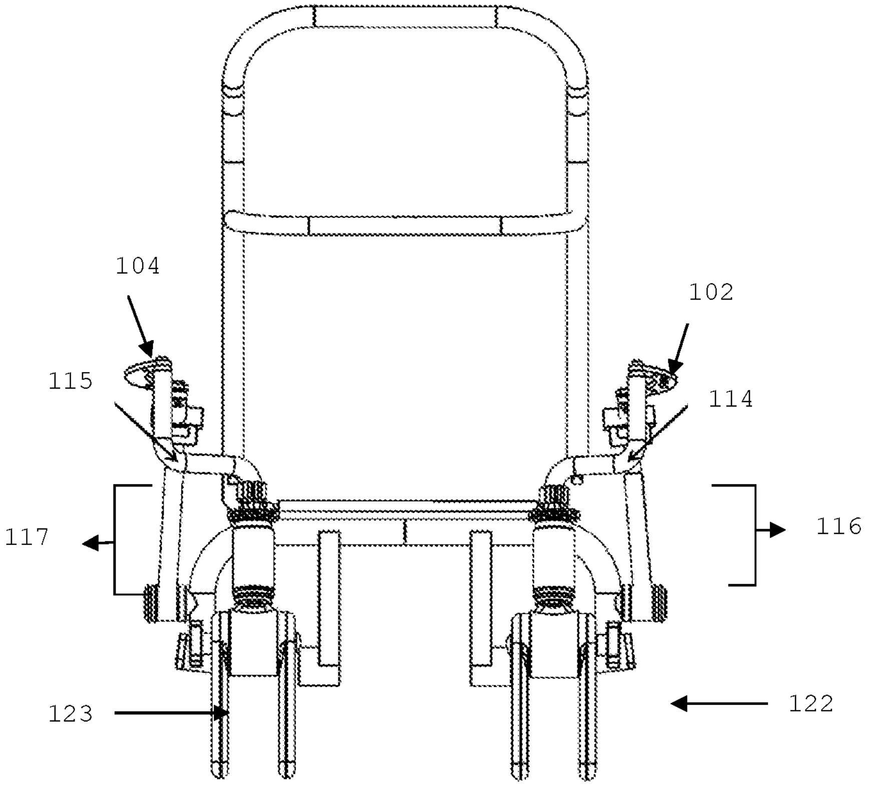
FIG. 20A: shows a back view of a mobile chair apparatus comprising the alternative steering assembly arrangement as described herein.
Figure 21:
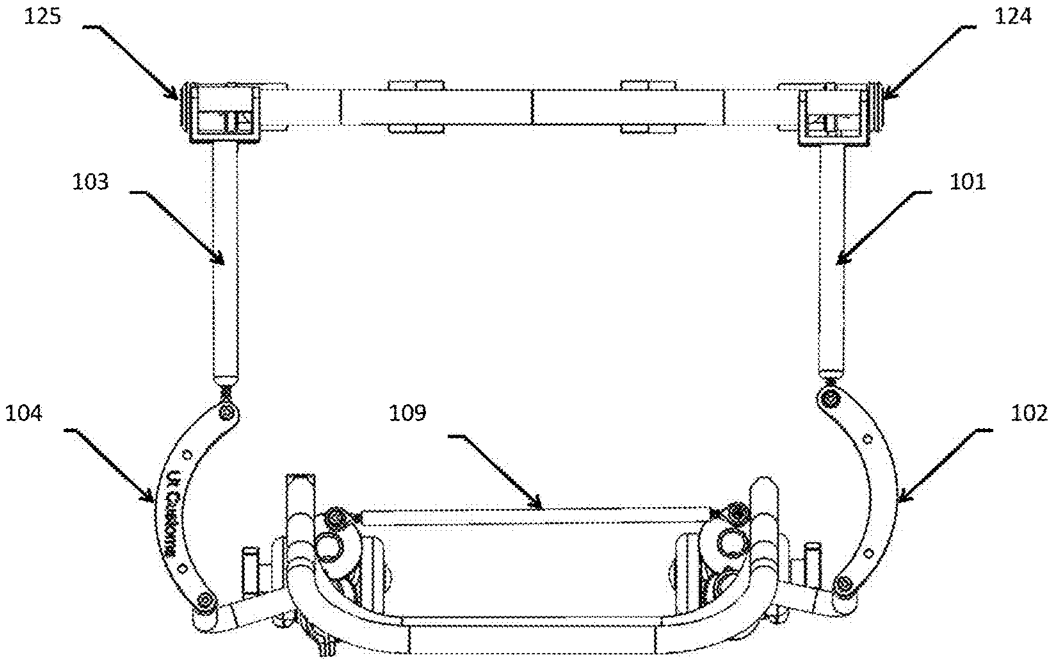
FIG. 21: shows a top view of a mobile chair apparatus comprising the alternative steering assembly arrangement as described herein. Seat (301) which may be mounted on a chair frame is not shown.
Figure 22A:
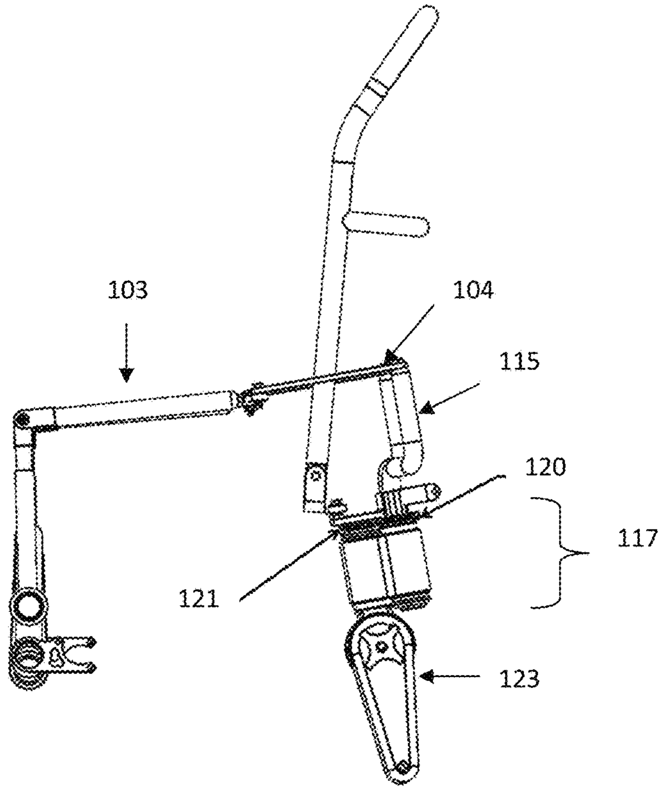
FIGS. 22A and 22B: show left side views of a mobile chair apparatus comprising the alternative steering assembly arrangement as described herein. Seat (301) which may be mounted on a chair frame is not shown in FIG. 22A.
Figure 22B:
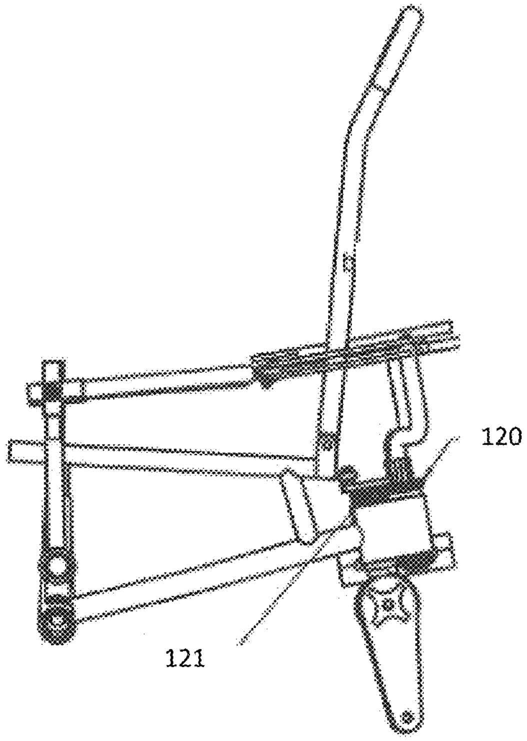
Figure 23A:
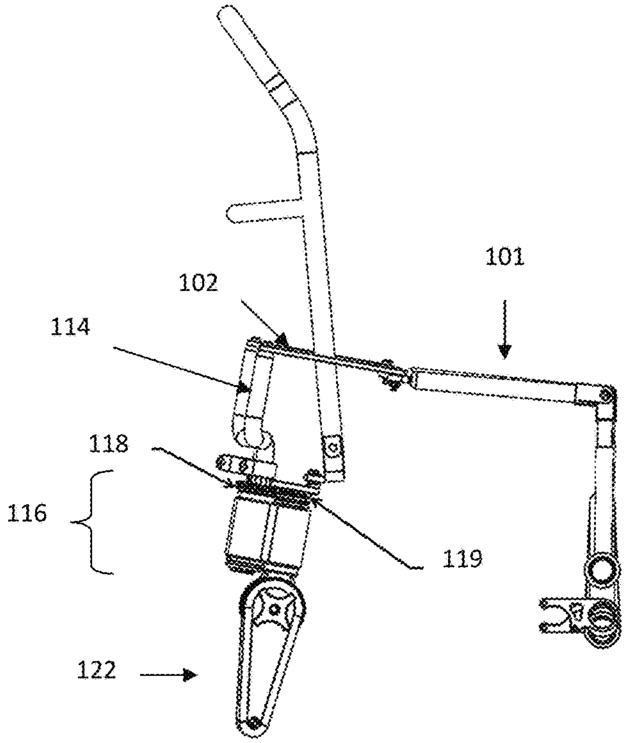
FIGS. 23A and 23B: show right side views of a mobile chair apparatus comprising the alternative steering assembly arrangement as described herein. Seat (301) which may be mounted on a chair frame and portions of the frame are not shown in FIG. 23A, so as to provide a clear view of the steering components in the steering assembly.
Figure 23B:
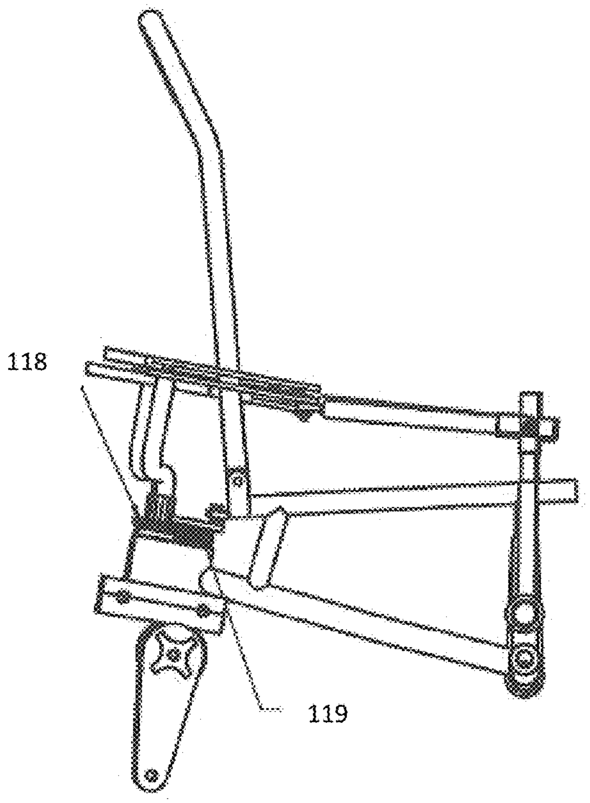

Referring to FIG. 18, an embodiment of the steering assembly (10) comprises: (i) a first armrest (101, not visible in FIG. 18 but seen in other figures) connected to a first link arm (102), and a second armrest (103) connected to a second link arm (104), wherein the first and second armrests are preferably disposed on opposite sides of the mobile chair apparatus; (ii) a first tie rod (105) connected to the first link arm (102) and a second tie rod (106) connected to the second link arm (104); (iii) a first steering block (107) connected to the first tie rod (105) and a second steering block (108) connected to the second tie rod (106); (iv) a third tie rod (109) interconnecting the first and the second steering blocks (107, 108); and (v) a first steering wheel (110) and a second steering wheel (111) each located at the rear end (1*b*) of the mobile chair apparatus (1), and preferably disposed on opposite sides of the mobile chair apparatus, and whose orientation relative to the drive wheels (202, 203) may be established by the relative positions of one or both of the first and second armrests (101, 103), and which orientation may be changed by changing the relative positions of one or both of the first and second armrests (101, 103). The first and second steering wheels move in response to movement of one or both of the first and second armrests (101, 103).

The two armrests (101, 103), the two link arms (102, 104) the two steering blocks (107, 108) and the three tie rods (105, 106 and 109) together form an interconnected system that ensures sliding movement of either armrest by an occupant user translates into corresponding movement of both steering wheels (110, 111). With this configuration, the Pedal Chair can be steered by using either arm, without use of working fingers. The turning radius of the rear two steering wheels is advantageously at least about 90° of arc, but greater (viz. to about 180° of arc) or lesser degrees of motion, but preferably at least about 10° of arc are also considered to be within the scope of this invention. With this design, the Pedal Chair can virtually turn within its own diameter. A suitable size for the drive wheel is about 8 inches in diameter, but larger or smaller sizes are also easily used in the invention, In use, the occupant user rests one or both arms on the chair armrests, and steers the Pedal Chair by moving either arm, for instance forwardly and/or rearwardly, resulting in movement of armrests (101, 103) on both sides of the chair due to the mechanical interconnections of the several elements making up the steering assembly (10). The relative position of an armrest (101, 103) establishes the relative position of its tie rod (105, 106) connected to its steering block (107, 108), and in turn establishes the position or orientation of each steering wheel (110, 111) attached to an individual steering block (107, 108). In an embodiment, the steering wheels (110, 111) are attached to steering blocks (107, 108) via a steering wheel rod (112) and one or more steering wheel support component (113). According to this design, the movement of steering block (107, 108) is transferred to the steering wheel by rotation of the steering wheel rod and the one or more steering wheel support component. In the figures the steering wheel support components (113) are depicted on only the outside of the steering wheel. However, embodiments where one or more support components are located on the inside or both sides of the steering wheel are envisioned to be within the scope of the present invention.

Movement of the armrests (101, 103) thereby imparts direct control over the steering wheels (110, 111) and the ability for the Pedal Chair to turn. By sliding even one of the armrests (101, 103) in the direction of travel desired, a user causes the rear wheels to turn in that direction and thereby providing steering control.

In a separate embodiment of the present invention, and with reference to FIGS. 20-24 in particular, an alternative arrangement for the steering assembly (10) is provided comprising (i) a first armrest (101) operably connected to a first link arm (102), and a second armrest (103) operably connected to a second link arm (104), wherein the first and second armrest are preferably disposed on opposite sides of the mobile chair apparatus; (ii) a first steering tube (114) operably connected to the first link arm (102) and a second steering tube (115) operably connected to the second link arm (104); (iii) a first gear assembly (116) operably connected to the first steering tube (114) and a second gear assembly (117) operably connected to the second steering tube (115); and (iv) a first steering wheel (110) operably connected to the first gear assembly (116) and a second steering wheel (111) operably connected to the second gear assembly (117), wherein the first and second steering wheels (110, 111) are located at the rear end (1*b*) of the mobile chair apparatus (1), and move in response to movement of one or both of the first and second armrests (101, 103).

In the alternative arrangement for the steering assembly (10) discussed above, the mobile chair apparatus (1) is steered via movement of one or both of the first and second armrests (101, 103), each of said first and second armrests (101, 103) being connected to a respective "steering wish bone", also referred to herein as the first and second link arms (102, 104), which first and second link arms (102, 104) turn the first and second steering tubes (114, 115). This arrangement allows turning of the first and second steering tubes (114, 115) left and right with respect to their longitudinal axis.

The first and second steering tubes (114, 115) are operably connected to the first and second gear assemblies (116, 117), respectively. Preferably, the first and second gear assemblies (116, 117) each comprises at least two gears, more preferably at least a large gear (118, 120) and a small gear (119, 121) (i.e., the 2 gears are of different sizes), and the first steering tube (114) operably connects to one of the at least two gears in the first gear assembly (116), which one of the at least two gears in the first gear assembly (116) in turn operably connects to, and turns, the other of the at least two gears in the first gear assembly (116).

For example, in an embodiment the first steering tube (114) has a large gear (118) mounted thereon, which in turn intermeshes and turns a small gear (119), which small gear (119) is mounted to shaft which rotates a first wheel dropout (122) on one side of the Pedal Chair, which first wheel dropout (122) is operably connected to the first steering wheel (110). Rotation of the first wheel dropout (122) left or right provides turning to the first steering wheel (110).

A skilled person in the art would readily recognize that analogous linkage arrangement comprising the second armrest (103), the second link arm (104), the second steering tube (115), the second gear assembly (117), a second wheel dropout (123) which is operably connected to the second steering wheel (111), can be used on the other (opposite) side of the Pedal chair.

In a further embodiment, a connecting tie rod (109) is connected to the first and second gear assemblies (116, 117), or the pair of large gears (118, 120), or the pair of small gears (119, 121), or the wheel dropouts (122, 123) or steering wheels (110, 111) on two sides of the Pedal Chair such that movement of either armrest (101 or 103) will turn both steering wheels (110, 111).

This alternative steering assembly arrangement allows for turning of the steering wheels (110, 111) when the Pedal Chair is not in motion. The ability to reset the steering wheels (110, 111) while the mobile chair apparatus is stopped is an important advantage of the Pedal Chair as described herein.

Figure 24:
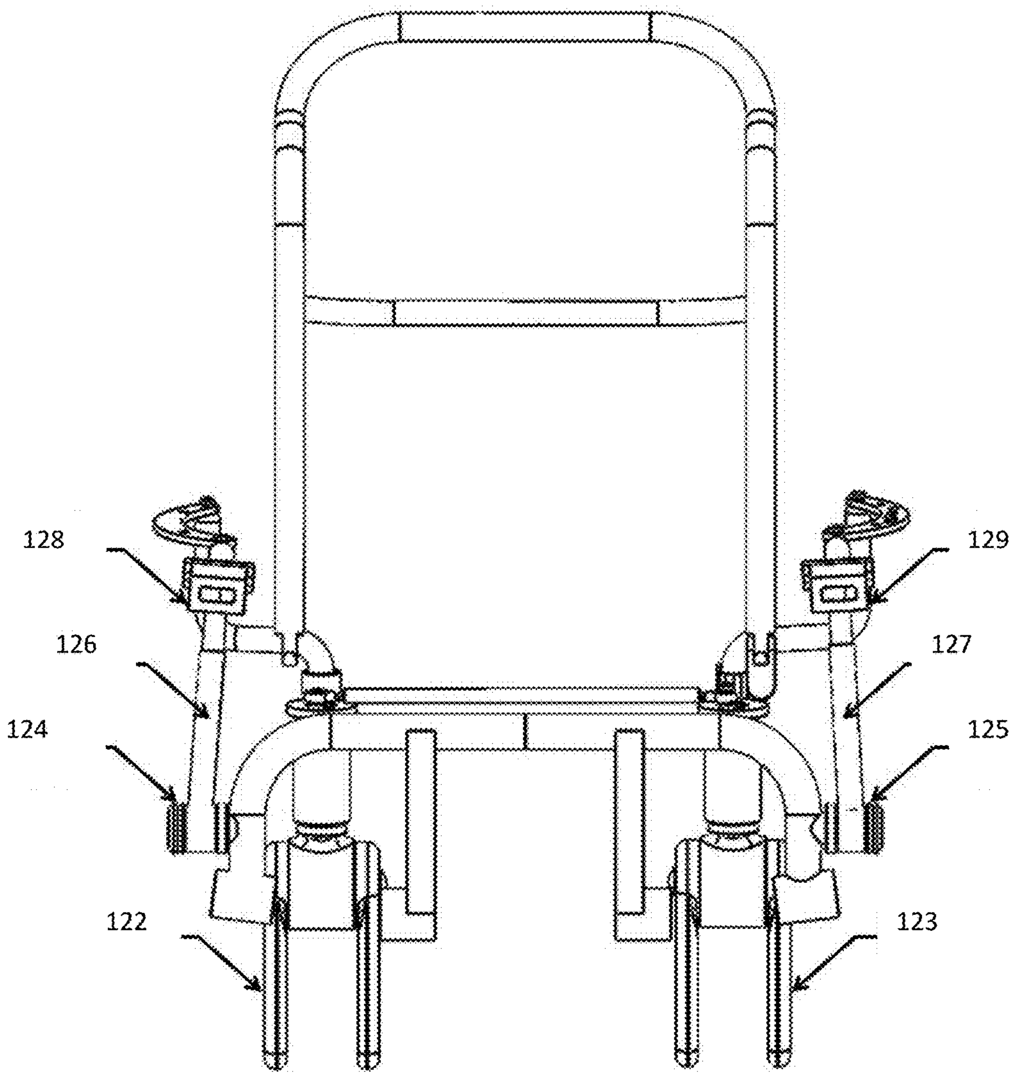
FIG. 24: shows a front side view of a mobile chair apparatus comprising the alternative steering assembly arrangement as described herein. Seat (301) which may be mounted on a chair frame is not shown.

With reference to FIGS. 21-24 in particular, it can be seen that the front of armrests (101, 103) are attached to a support arm assembly. The support arm assembly pivots at the frame attachment and the armrest to allow for movement of the armrest. Hinged support arms (not shown in FIG. 21) are attached to the frame via pivot points shown in FIG. 21 (124, 125). FIG. 24 shows the support arms (126,127), the pivot point attached to the frame (124,125) and the support arm pivot attachment to the armrest (128, 129).

The Drive Assembly (20)

The primary function of the drive assembly is to translate or transfer the rotational motion of the foot pedals (201) to the rotational motion of the first and the second drive wheels (202, 203). A suitable size for the drive wheel is about 20 inches in diameter, but larger or smaller sizes are also easily used in the invention, with smaller sized drive wheels more suitable for juvenile sized Pedal Chairs.

Figure 10:
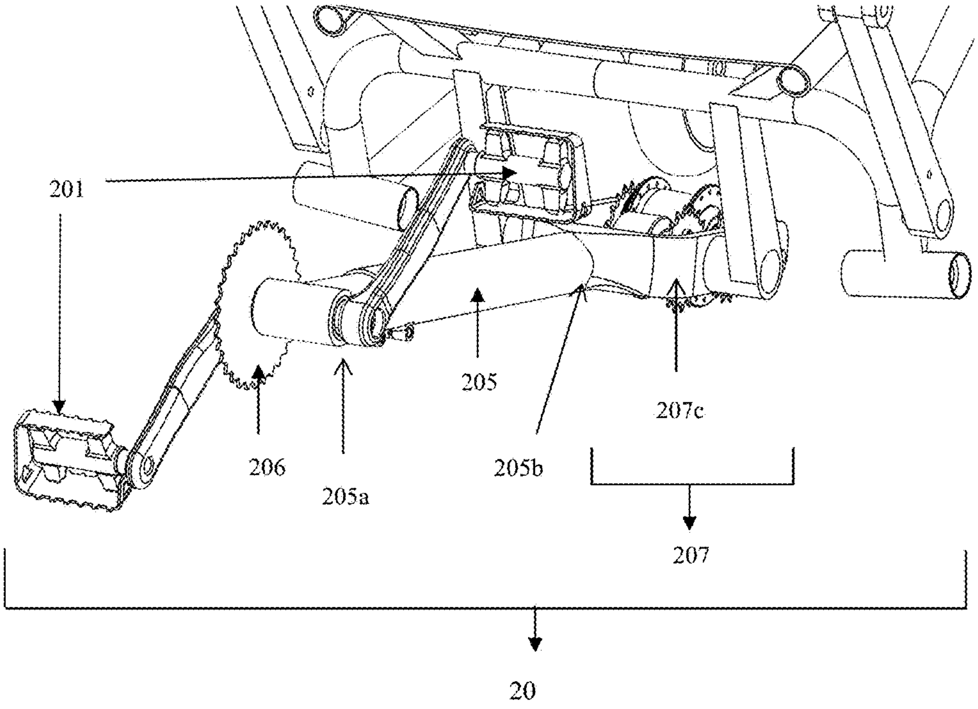
FIG. 10: shows a perspective, close-up view of an example of the drive assembly as described herein.
Figure 11:
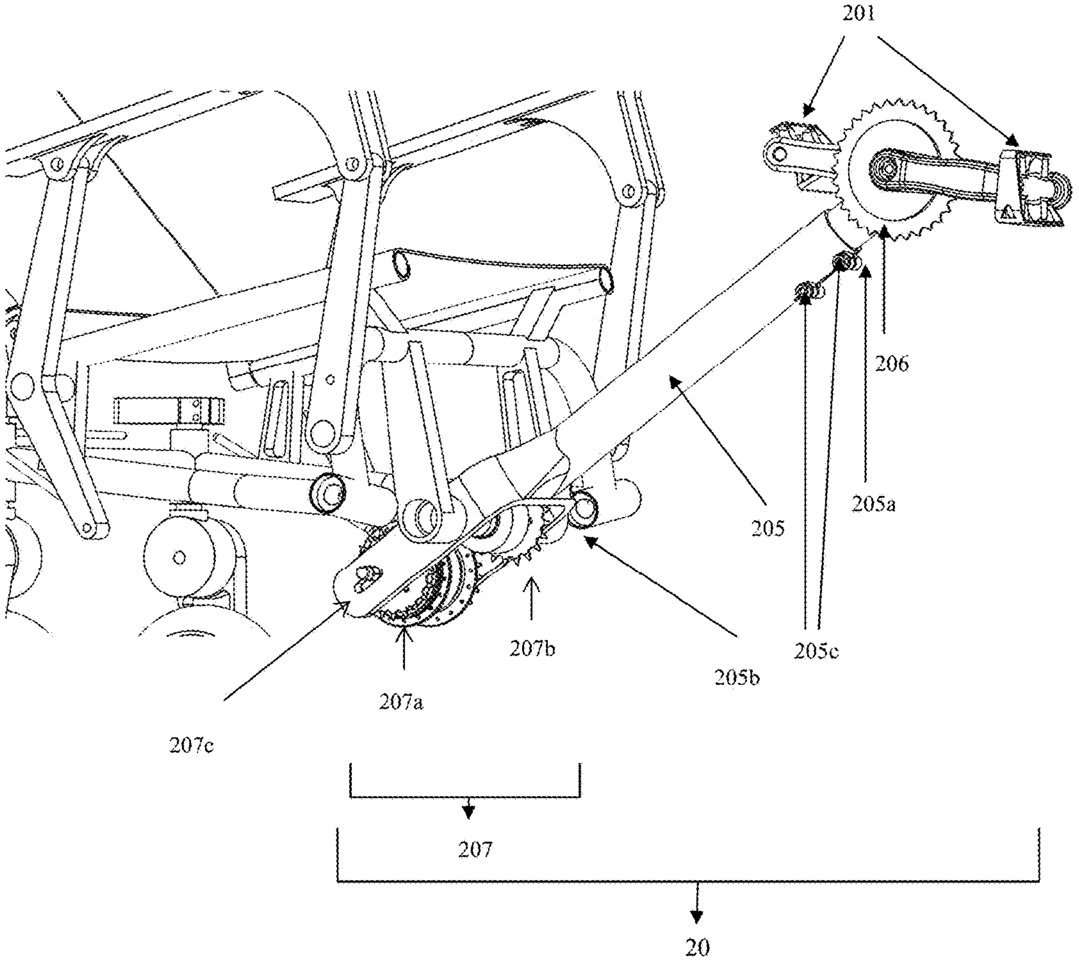
FIG. 11: shows a perspective, close-up view of an example of the drive assembly as described herein.
Figure 12:
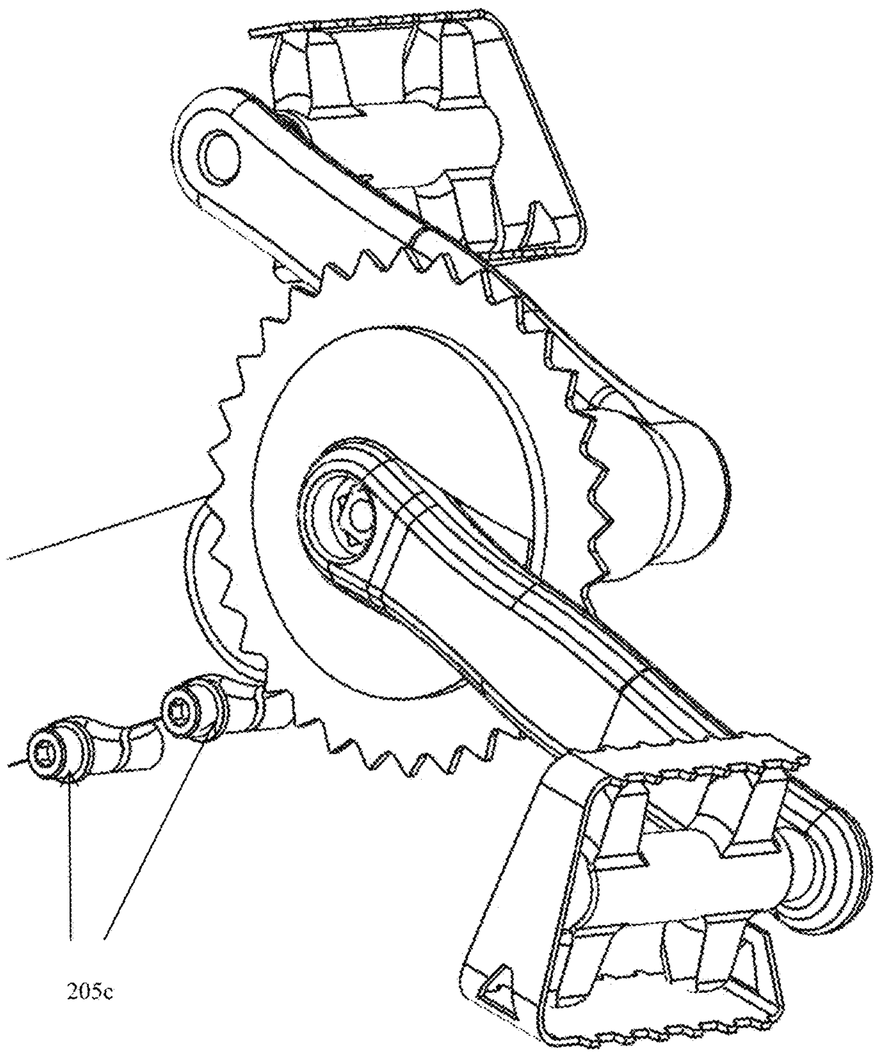
FIG. 12: shows a perspective, close-up view of an example of the foot pedals, associated pedal crank and boom extension locking bolts as described herein.
Figure 13:
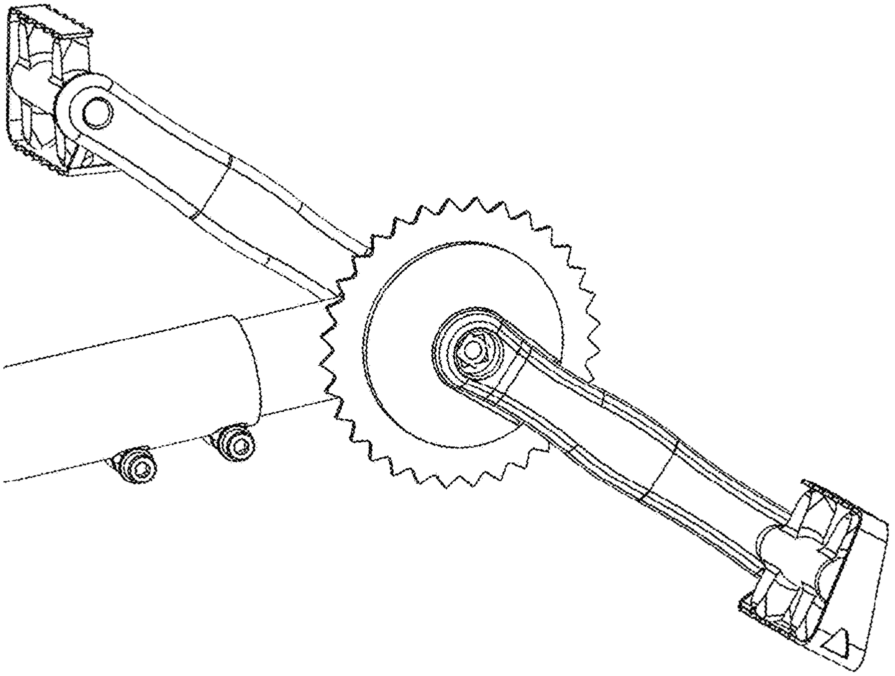
FIG. 13: shows a perspective, close-up view of an example of the foot pedals, associated pedal crank and boom extension locking bolts as described herein.
Figure 14:
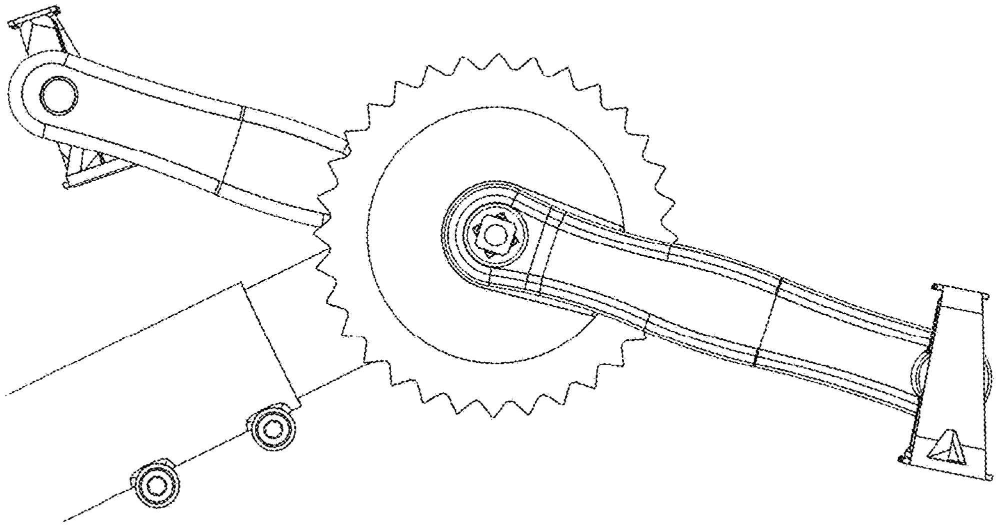
FIG. 14: shows a side, close-up view of an example of the foot pedals and associated pedal crank as described herein.
Figure 15:
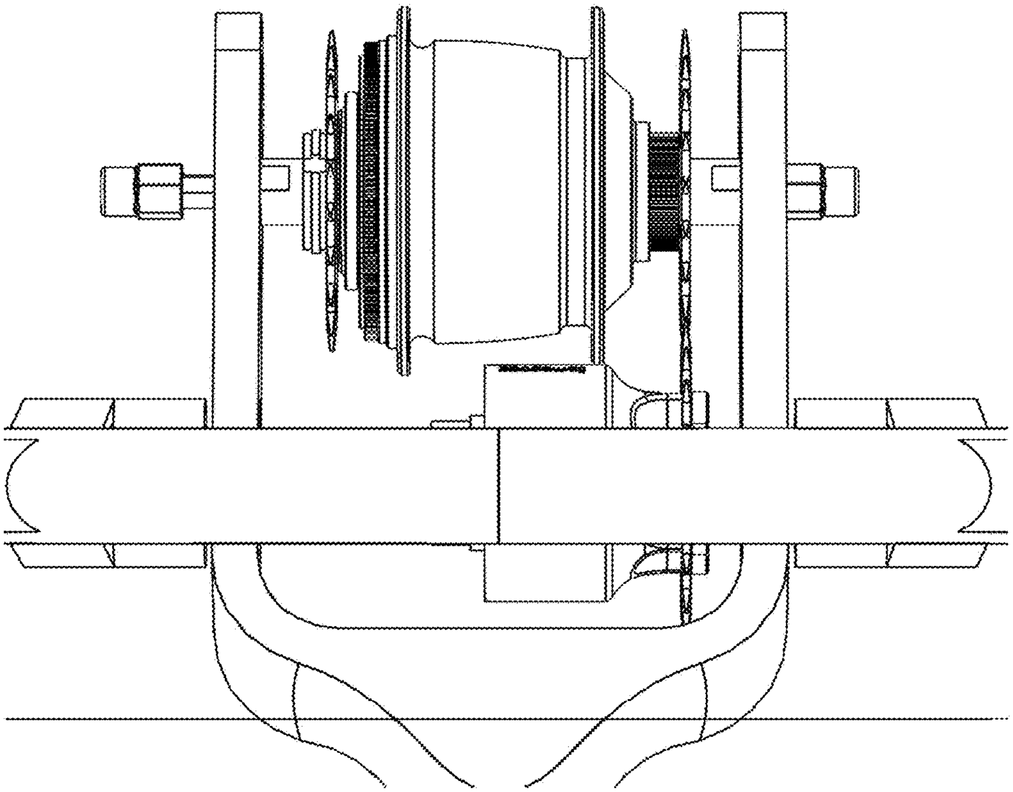
FIG. 15: shows a bottom, close-up view of an example of the gear hub (including transmission) as described herein.
Figure 16:
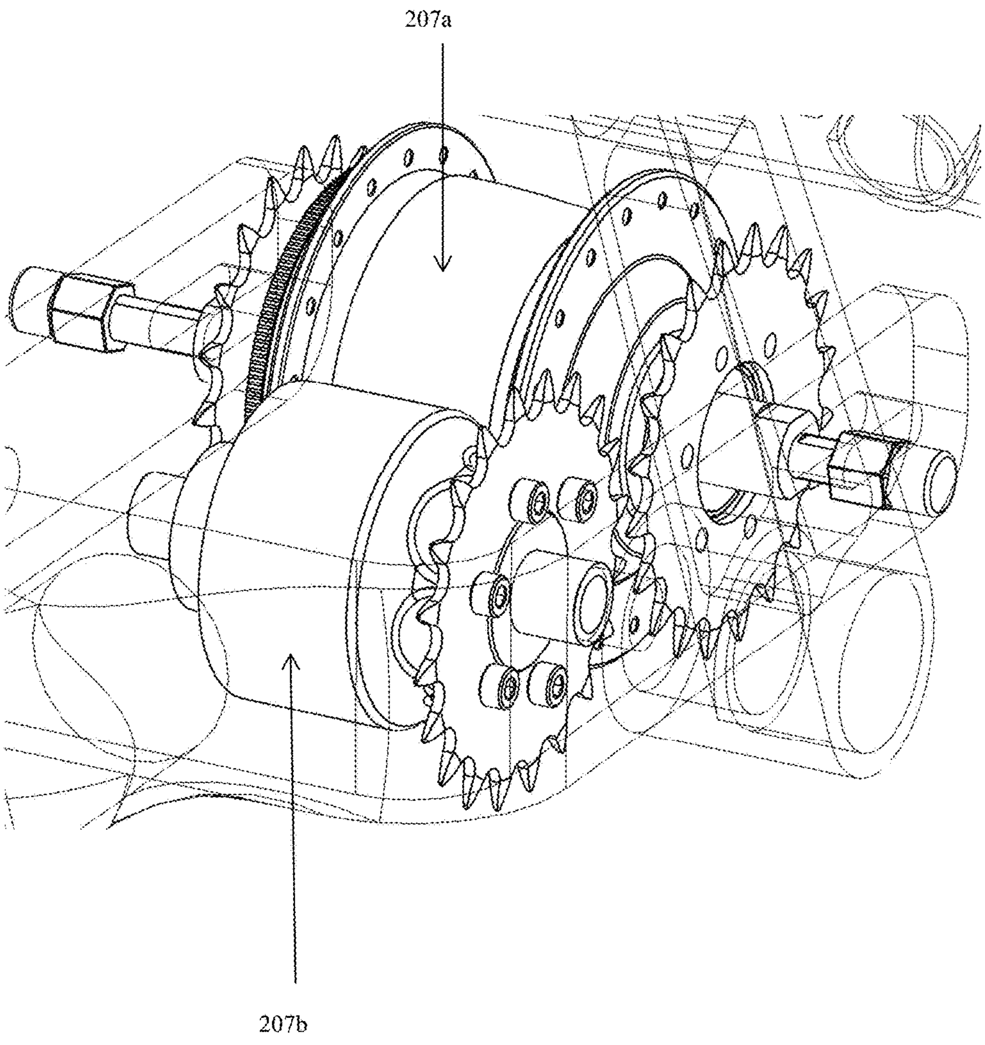
FIG. 16: shows a perspective, close-up view of an example of the gear hub (including transmission and differential) as described herein.
Figure 17:
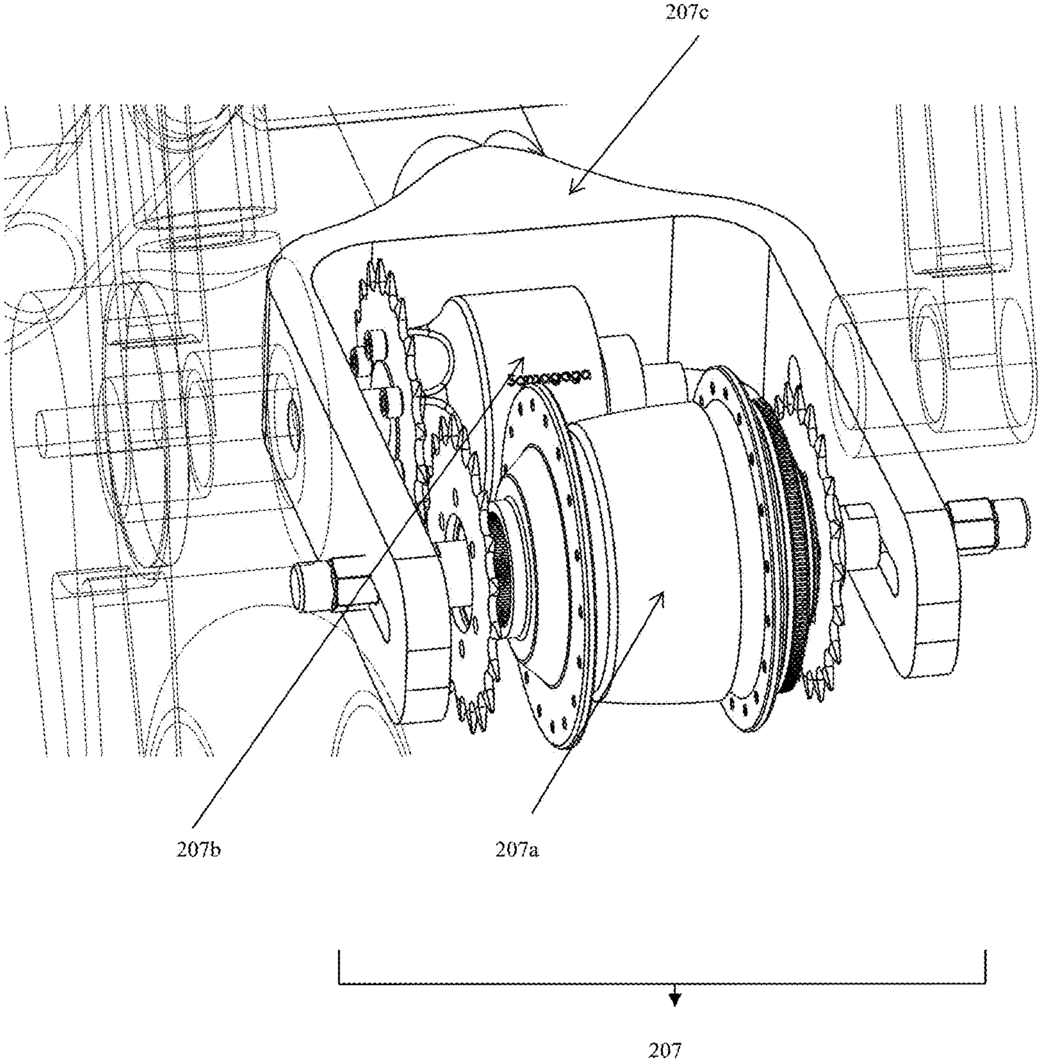
FIG. 17: shows a perspective, close-up view of an example of the gear hub (including transmission and differential) as described herein.

Referring to FIGS. 10 and 11, an embodiment of the drive assembly comprises components (i)-(vi): (i) a first drive wheel (202, not shown in FIGS. 10 and 11 but shown in other figures) and a second drive wheel (203, not shown in FIGS. 10 and 11 but shown in other figures each connected to an axle (204, not shown in FIGS. 10 and 11 but shown in other figures), which axle (204) can be common or separate; (ii) a support shaft (205) having a distal end (205*a*) and a proximal end (205*b*), wherein the proximal end (205*b*) of the support shaft is preferably located on the bottom side (1*d*) of the mobile chair apparatus (1); (iii) a pair of foot pedals (201) connected to a pedal crank (206) preferably located at the distal end (205*a*) of the support shaft (205); (iv) a gear hub (207) preferably located at the proximal end (205*b*) of the support shaft (205); (v) a first chain (not shown in the figures for purposes of retaining clarity in the drawing figures, but to be understood as operatively) connecting the pedal crank (206) to the transmission (207*a*) of the gear hub (207) whereby the chain transmits motive power from the pedal crank (206) to the transmission (207*a*) of the gear hub (207); and (vi) a second chain (also not shown in the figures for purposes of retaining clarity in the drawing figures) shorter in length than the first chain, said second chain (to be understood as operatively) connecting the transmission (207*a*) to a differential (207*b*) of the gear hub (207), which differential (207*b*) drives the axle or axles (204), whereby the small chain transmits motive power from the transmission (207*a*) to the axle or axles (204). FIGS. 10 and 11 show preferable but optional elements including the differential (207*b*) and a yoke (207*c*). FIG. 11 also shows optional element boom extension locking bolts (205*c*) which can lock/tighten the position of the length-wise adjustable boom.

The connection to the drive wheels (202, 203) can be achieved via a double chain configuration including a transmission (207*a*) and differential (207*b*) as described above or a direct connection (e.g., via a chain, a belt, a shaft) to a gear hub (207) that drives the separate axles, or common axle. The transmission can provide one or more forward gears (either "step up" or "step down" gears) and optionally one or more reverse gears. The gear hub (207) may assist the user in providing sufficient motive energy to the drive wheels (202, 203), and allows the Pedal Chair (1) to accommodate users of with different types and/or degree of disabilities, e.g., a person having reduced mobility in both legs, or a person having reduced mobility in only one working leg, with the other leg having a greater or lesser relative degree of mobility. It is to be understood that in alterative embodiments, the foot pedals (201) or pedal crank (206) may be operatively connected via a chain, a belt, a shaft or other mechanical linking means or linkage elements to the gear hub (207), as it is only necessary that the motive force provided by the user of the Pedal Chair via the pedals (201) be transferred or transmitted to the gear hub (207). In preferred embodiments the gear hub (207) and/or the transmission (207*a*, if present) incorporates into its construction a clutch assembly which allows for the rotation of the drive wheels (202, 203) even when the pedals (201) and their pedal crank (206) are not being rotated by the user of the Pedal Chair. In further preferred embodiments the gear hub (207) and/or transmission (207*a*, if present) incorporates into its construction a 'coaster brake' assembly which halts the rotation of the gear hub (207) (and/or the transmission 207*a*) when the rotational direction of the pedals (201) is reversed. Such "coaster brake" assemblies are known from single-speed and multi-speed bicycles, e.g., "Bendix" coaster brake rear hubs. Further braking mechanisms conventionally used in bicycles and wheelchairs are known to those having ordinary skill in the art, and can be incorporated into the Pedal Chair as descried herein.

In one embodiment the gear hub (207) is directly connected to the axle or axles (204) and is fully operative without an intermediate transmission (207*a*), which may be omitted. In such an embodiment such a gear hub (207) optionally but preferably incorporates into its construction a clutch assembly and/or a 'coaster brake' assembly as discussed above. The provision of a 'coaster brake' assembly provides an ancillary means for stopping the rotation of the drive wheels (202, 203) which may also be stopped by the user of the Pedal Chair manually grasping or gripping parts of the drive wheels (202, 203). In a further embodiment, a common axle is not present, but rather separate axles connect the first drive wheel (202) and the second drive wheel (203) part of the Pedal Chair. In such an embodiment, suitable mechanical or electro-mechanical means couple the gear hub (207) and/or the transmission (207*a*) to each of these separate axles connected to the first drive wheel (202) and the second drive wheel (203) and the mechanical or electro-mechanical means are used to drive one or both of the drive wheels (202, 203).

With reference to FIG. 25, according to a further embodiment of the present invention, the drive assembly (20) alternatively comprises: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle. According to this design, the need for a second chain and transmission is eliminated for a simpler and more basic mobile chair apparatus. As compared to the first embodiment of the drive assembly (20) described above, according to an alternative design for the drive assembly (20), transmission (207*a*) and the first chain directly attached to the transmission (207*a*) are eliminated.

According to a further embodiment of the present invention, the drive assembly (20) includes an electrical motor assist or includes a provision for incorporating an electrical motor assist in the future. The motor assist feature allows a person having limited physical ability to pedal on flat surfaces, and provide assistance only when needed, such as when the user is tired, or when the surface on which the Pedal Chair is traversing is more challenging. The motor assist is also a useful feature when the Pedal Chair is being used as an exercise/rehabilitation device. Specifically, a person can use the motor assist feature to perform interval training, that is, pedal for a period of time, then rest for a period of time, depending on the targeted rehabilitation protocol.

In use, an occupant user of the Pedal Chair enters and sits in the chair via a side/front entrance, and then swings their legs over the support shaft (boom). The feet of the user would be placed on the foot pedals. The feet can either be rested on the foot pedals, or strapped in via any known and available device for securing feet to, e.g., bicycle pedals or toe clips.

To propel the chair forward, the occupant user moves one or both legs in a circular motion on the foot pedals (201) which causes the pedal crank (206) to rotate; this motive force is translated via a chain, a belt, a shaft or other mechanical linking means or linkage elements to the gear hub (207), which in turn operates to rotate the drive wheels (202, 203). In the alternative drive assembly arrangement detailed above, the motive force of the rotating crank can be translated via a single chain to the axle (204), which in turn operates to rotate the drive wheels (202, 203), without need for a second chain. Movement speed of the Pedal Chair can be varied by varying speed of pedaling. Braking can be provided by a disc brake mounted on the front driving wheels which is actuated by a lever mounted on the armrest. Braking can also be provided by simply stopping pedaling, and if needed pedal in reverse.

Advantages of the Pedal Chair (1)

The Pedal Chair described herein provides stability, foldability and adjustability. Stability of the Pedal Chair is supported by the four wheels making simultaneous contact with the ground. The configuration of the four wheels provides an inherent stability to the Pedal Chair and makes the need for any kind of additional "outrigger" support unnecessary, or the need for a fifth (or further) wheel(s) necessary. The front drive wheels can be configured with negative camber to provide lateral stability at movement speeds not exceeding 4 mph. The rear steering wheels provide longitudinal stability at varying movement speeds and on inclines. The Pedal Chair is designed to be compliant with access requirements of the Americans with Disabilities Act (ADA).

One additional advantageous feature which, in preferred embodiments (as shown in the drawing figures) is provided by the Pedal Chair is its foldability. Specifically, the support shaft (boom) is able to swing under the chair by rotation around the axle or axles, thus the chair apparatus can be folded to accommodate a small storage space. This foldability is achievable with the double chain configuration or the single chain configuration (i.e., if the foot pedals (201) or pedal crank (206) is connected directed to the axle or axles (without the secondary small chain)). The seatback of the chair can also be connected to the seat or a chair frame on which the seat is mounted via a hinge or pivot connection so as to allow the seatback to fold down, thus providing further space reduction. The rear (steering) wheels can also be foldable through a release mechanism, thus providing yet further space reduction. Further, the two drive wheels can be connected via a quick release mechanism allowing for easy removal and installation. At its smallest size, the Pedal Chair has a dimension not exceeding 26 inches by 31 inches by 33 inches, allowing it to be portable, and fits into standard sized car trunk.

Another advantage of the Pedal Chair is its adjustability. Because the support shaft can be configured to be adjustable in both length (via the longitudinally sliding motion of an inner shaft within the outer shaft and locking bolts) and angle, the chair can comfortably accommodate users of a wide range of weight, height, built, etc. In a preferred embodiment, the boom can be adjusted lengthwise for up to 8 inches. The boom designed allowing it to be able to fold under the chair also allows the angle it forms to be adjusted up or down and then secured using a locking mechanism, which can be the same locking mechanism used to release and tighten the boom to fold under the chair.

Components of the mobile chair as described hereinabove can be made from conventional materials known in the art. In an embodiment, one or more components of the mobile chair or portions of said component or components can be made from aluminum, carbon fiber, or a mixture of both.

Finally, the combination of any embodiment or feature mentioned herein with one or more of any of the other separately mentioned embodiments or features is contemplated to be within the scope of the instant invention. In particular, each steering assembly arrangement described hereinabove can be combined with each drive assembly arrangement described hereinabove to produce the final Pedal Chair.

What is claimed is:

1. A mobile chair apparatus having a front end, a rear end, a top side and a bottom side, comprising:
- (a) a steering assembly comprising:
  - (i) a first armrest operably connected to a first link arm, and a second armrest operably connected to a second link arm;
  - (ii) a first steering tube operably connected to the first link arm and a second steering tube operably connected to the second link arm;
  - (iii) a first gear assembly operably connected to the first steering tube and a second gear assembly operably connected to the second steering tube;
  - (iv) a first steering wheel operably connected to the first gear assembly and a second steering wheel operably connected to the second gear assembly, wherein the first and second steering wheels are located at the rear end of the mobile chair apparatus, and move in response to movement of one or both of the first and second armrests, and
- (b) a drive assembly, and
- (c) a seat.

2. The mobile chair apparatus of claim 1, wherein the drive assembly comprises:
- i. a first drive wheel and a second drive wheel each connected to an axle, wherein diameters of the first and second drive wheels are larger than diameters of the first and second steering wheels;
- ii. a support shaft having a distal end and a proximal end, wherein the proximal end of the support shaft is located on the bottom side of the mobile chair apparatus;
- iii. a pair of foot pedals connected to a crank located at the distal end of the support shaft;
- iv. a gear hub located at the proximal end of the support shaft;
- v. a first chain connecting the crank to the gear hub; and
- vi. a second chain shorter in length than the first chain, said second chain connecting the gear hub to the axles, or connecting components of the gear hub.

3. The mobile chair apparatus of claim 2, wherein the gear hub comprises a transmission and a differential.

4. The mobile chair apparatus of claim 3, wherein the first chain is connected to the transmission and the second chain is connected to the differential, and the differential is configured to drive the axle.

5. The mobile chair apparatus of claim 3, wherein the transmission comprises one or more forward gears and/or one or more reverse gears.

6. The mobile chair apparatus of claim 2, wherein diameter of the first and second drive wheels is about 20 inches.

7. The mobile chair apparatus of claim 1, wherein the drive assembly further comprises an electrical motor assist.

8. The mobile chair apparatus of claim 1, wherein the support shaft comprises an inner shaft housed longitudinally in a larger and hollow outer shaft, such that the support shaft is length-wise adjustable with longitudinal sliding motion of the inner shaft within the outer shaft.

9. The mobile chair apparatus of claim 1, wherein the first and second steering wheels have a turning radius of about 90° in a right direction and about 90° in a left direction.

10. The mobile chair apparatus of claim 1, wherein diameter of the first and second steering wheels is about 8 inches.

11. The mobile chair apparatus of claim 1, wherein the drive assembly comprises a pair of foot pedals which comprise straps for securing a user's feet.

12. The mobile chair apparatus of claim 1, having a width not exceeding 32 inches.

13. The mobile chair apparatus of claim 1, configured such that no more than four wheels are in contact with the ground when in operation.

14. The mobile chair apparatus of claim 1, configured such that exactly four wheels are in contact with the ground when in operation.

15. The mobile chair apparatus of claim 1, which is free of an outrigger.

16. The mobile chair apparatus of claim 1, wherein a seatback is connected to a chair frame via a hinge connection.

17. The mobile chair apparatus of claim 1, consisting essentially of components (a)-(c).

18. The mobile apparatus of claim 1, wherein the drive assembly comprises:
- i. a first drive wheel and a second drive wheel each connected to an axle;
- ii. a support shaft having a distal end and a proximal end, wherein the proximal end of the support shaft is located on the bottom side of the mobile chair apparatus;
- iii. a pair of foot pedals connected to a crank located at the distal end of the support shaft; and
- iv. a chain operably connecting the crank to the axle.

19. The mobile apparatus of claim 18, wherein diameter of the first and second drive wheels is about 20 inches.

20. The mobile chair apparatus of claim 1, wherein the drive assembly comprises a pair of foot pedals which do not comprise straps for securing a user's feet.

21. A mobile chair apparatus having a front end, a rear end, a top side and a bottom side, comprising:
- (a) a steering assembly comprising:
  - i. a first armrest connected to a first link arm, and a second armrest connected to a second link arm;
  - ii. a first tie rod connected to the first link arm and a second tie rod connected to the second link arm;
  - iii. a first steering block connected to the first tie rod and a second steering block connected to the second tie rod;
  - iv. a third tie rod interconnecting the first and the second steering blocks; and
  - v. a first steering wheel and a second steering wheel each located at the rear end of the mobile chair apparatus, the first and second steering wheels move in response to movement of one or both of the first and second armrests, and (b) a drive assembly comprising:

i. a first drive wheel and a second drive wheel each connected to an axle;

ii. a support shaft having a distal end and a proximal end, wherein the proximal end of the support shaft is located on the bottom side of the mobile chair apparatus;

iii. a pair of foot pedals connected to a crank located at the distal end of the support shaft; and iv. a chain operably connecting the crank to the axle; and, (c) a seat.

* * * * *